US007103206B2

(12) United States Patent
Graves et al.

(10) Patent No.: US 7,103,206 B2
(45) Date of Patent: Sep. 5, 2006

(54) METHOD AND APPARATUS FOR DETECTING DOUBLED BILLS IN A CURRENCY HANDLING DEVICE

(75) Inventors: Bradford T. Graves, Arlington Heights, IL (US); Sanjay A. Shivde, Bensenville, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 623 days.

(21) Appl. No.: 09/779,919

(22) Filed: Feb. 8, 2001

(65) Prior Publication Data

US 2001/0035603 A1 Nov. 1, 2001

Related U.S. Application Data

(60) Provisional application No. 60/180,965, filed on Feb. 8, 2000, provisional application No. 60/181,752, filed on Feb. 11, 2000.

(51) Int. Cl.
*G06K 9/00* (2006.01)

(52) U.S. Cl. ........................ 382/135; 356/71; 209/534; 194/207

(58) Field of Classification Search ................ 382/135, 382/137, 138, 141, 209, 217, 218; 194/206, 194/207; 209/534; 235/379; 217/6, 263; 271/6, 263; 356/71, 435; 377/8; 250/223 R, 250/559.11

See application file for complete search history.

(56) References Cited

U.S. PATENT DOCUMENTS 3,160,855 A 12/1964 Holt ........................... 382/310
3,246,295 A 4/1966 DeClaris et al. ............ 382/321
3,578,315 A 5/1971 Milford ...................... 271/263
3,787,664 A 1/1974 Johnson et al. ................ 377/8
3,870,629 A 3/1975 Carter et al. ................ 209/534

(Continued)

FOREIGN PATENT DOCUMENTS

DE 2856511 A1 7/1979

(Continued)

OTHER PUBLICATIONS

Mosler, Inc. brochure, "The Mosler/Toshiba CF-420", 1989.

(Continued)

*Primary Examiner*—Samir A. Ahmed
(74) *Attorney, Agent, or Firm*—Jenkens & Gilchrist

(57) ABSTRACT

A doubles detection system for detecting doubled documents. The system comprises one or more light sources disposed on a first side of a test document and one or more reflected light sensors disposed along the first side of the test document. The reflected light sensors are adapted to generate reflected light signals. The system also comprises one or more transmitted light sensors disposed along a second side of the test document which are adapted to generate transmitted light signals. The system also comprises a memory having a master reflected light value and a master transmitted light value stored therein. The system comprises a processor adapted to receive the reflected light signal, generate a reflected light value for the test document, and calculate a reflectance ratio between the reflected light value of the test document and a master reflected light value. The processor is also adapted to receive the transmitted light signal, generate a transmitted light value for the test document, and adjust the transmitted light value for the test document based on the reflectance ratio. The processor is adapted to compare the adjusted transmitted light value for the test document to the master transmitted light value and generate a doubles signal if the comparison of the adjusted transmitted light value for the test document with the master transmitted light value indicates that more than one document is present.

51 Claims, 23 Drawing Sheets

U.S. PATENT DOCUMENTS

| | | | | |
|---|---|---|---|---|
| 3,937,453 | A | 2/1976 | Hickey et al. | 271/4.09 |
| 3,976,198 | A | 8/1976 | Carnes, Jr. et al. | 209/534 |
| 4,023,011 | A | 5/1977 | Nakajima et al. | 235/478 |
| 4,025,420 | A | 5/1977 | Horino | 209/534 |
| 4,073,488 | A | 2/1978 | Uchida | 271/263 |
| 4,114,804 | A | 9/1978 | Jones et al. | 235/476 |
| 4,147,430 | A | 4/1979 | Gorgone et al. | 356/51 |
| 4,154,437 | A | 5/1979 | Butcheck et al. | 271/6 |
| 4,159,782 | A | 7/1979 | Swartzendruber | 221/1 |
| 4,179,031 | A | 12/1979 | Ward | 209/534 |
| 4,179,685 | A | 12/1979 | O'Maley | 382/135 |
| 4,237,378 | A | 12/1980 | Jones | 250/223 R |
| 4,243,216 | A | 1/1981 | Mazumder | 271/263 |
| 4,250,806 | A | 2/1981 | Boyson et al. | 101/2 |
| 4,255,057 | A | 3/1981 | Williams | 356/435 |
| 4,255,651 | A | 3/1981 | Phillips | 377/8 |
| 4,282,424 | A | 8/1981 | Hirose | 235/379 |
| 4,334,619 | A | 6/1982 | Horino et al. | 209/551 |
| 4,352,988 | A | 10/1982 | Ishida | 250/559.11 |
| 4,356,473 | A | 10/1982 | Freudenthal | 382/135 |
| 4,420,151 | A | 12/1983 | Kobayashi | 271/263 |
| 4,428,194 | A | 1/1984 | Strokes et al. | 60/779 |
| 4,442,541 | A | 4/1984 | Finkel et al. | 382/135 |
| 4,446,735 | A | 5/1984 | Weilacher | 73/597 |
| 4,458,816 | A | 7/1984 | Horino et al. | 209/548 |
| 4,464,787 | A | 8/1984 | Fish et al. | 382/135 |
| 4,479,049 | A | 10/1984 | Hirose | 235/379 |
| 4,487,306 | A | 12/1984 | Nao et al. | 194/206 |
| 4,592,090 | A | 5/1986 | Curl et al. | 382/135 |
| 4,596,924 | A | 6/1986 | Watanabe | 235/379 |
| 4,608,704 | A | 8/1986 | Sherman, III et al. | 377/8 |
| 4,616,817 | A | 10/1986 | Yamauchi et al. | 271/111 |
| 4,653,647 | A | 3/1987 | Hashimoto | 209/534 |
| 4,671,502 | A | 6/1987 | Sherman, III et al. | 271/4.01 |
| 4,693,010 | A | 9/1987 | Sills | 33/501.03 |
| 4,703,172 | A | 10/1987 | Sherman, III et al. | 250/223 R |
| 4,707,599 | A | 11/1987 | Sherman, III et al. | 250/223 R |
| 4,737,627 | A | 4/1988 | Hughes et al. | 250/223 R |
| 4,761,002 | A | 8/1988 | Reed et al. | 271/111 |
| 4,922,109 | A | 5/1990 | Bercovitz et al. | 250/556 |
| 4,973,851 | A | 11/1990 | Lee | 250/556 |
| 5,054,621 | A | 10/1991 | Murphy et al. | 209/534 |
| 5,163,672 | A | 11/1992 | Mennie | 271/187 |
| 5,201,395 | A | 4/1993 | Takizawa et al. | 194/206 |
| 5,207,788 | A | 5/1993 | Geib et al. | 271/122 |
| 5,295,196 | A | 3/1994 | Raterman et al. | 382/135 |
| 5,335,484 | A | 8/1994 | Hain | 53/582 |
| 5,341,408 | A | 8/1994 | Melcher et al. | 377/8 |
| 5,348,286 | A | 9/1994 | Buck | 271/263 |
| 5,430,664 | A | 7/1995 | Cargill et al. | 194/207 |
| 5,467,405 | A | 11/1995 | Raterman et al. | 382/135 |
| 5,467,406 | A | 11/1995 | Graves et al. | 382/135 |
| D369,984 | S | 5/1996 | Larsen | D10/97 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,751,840 | A | 5/1998 | Raterman et al. | 382/135 |
| 5,923,413 | A | 7/1999 | Laskowski | 356/71 |
| 5,966,456 | A * | 10/1999 | Jones et al. | 382/135 |
| 6,101,266 | A * | 8/2000 | Laskowski et al. | 382/135 |
| 6,393,140 | B1 * | 5/2002 | Itako | 382/135 |
| 6,486,464 | B1 * | 11/2002 | Ma et al. | 250/223 R |

FOREIGN PATENT DOCUMENTS

| | | | |
|---|---|---|---|
| EP | 0077464 | A2 | 9/1982 |
| EP | 0077464 | B1 | 9/1982 |
| EP | 0149699 | A1 | 7/1985 |
| EP | 0078708 | B1 | 3/1987 |
| EP | 0338123 | A2 | 11/1988 |
| EP | 0338123 | A3 | 11/1988 |
| EP | 0342647 | A2 | 5/1989 |
| EP | 0404287 | B1 | 12/1990 |
| GB | 2067285 | | 7/1981 |
| GB | 2204166 | A | 11/1988 |
| JP | 58-18788 | | 2/1983 |
| JP | 59 496682 | | 3/1984 |
| JP | 60 79487 | | 5/1985 |
| JP | 04 134584 | | 5/1992 |
| WO | WO90/07165 | | 6/1990 |
| WO | WO91/11778 | | 8/1991 |
| WO | WO92/17394 | | 10/1992 |
| WO | WO93/23824 | | 11/1993 |
| WO | WO94/19773 | | 9/1994 |
| WO | WO95/24691 | | 9/1995 |
| WO | WO96/10800 | | 4/1996 |

OTHER PUBLICATIONS

AFB Currency Recognition System (1982), 1 page.

JetScan Currency Scanner/Counter, Model 4060, Operator's Manual by Cummins-Allison (Aug. 1991).

JetScan Currency Scanner/Counter: Model 4060, Brochure.

Sale of JetScan Currency Scanner/Counter, Model 4060 (Aug. 1991), 3 pages.

JetScan Currency Scanner/Counter, Model 4061, Operating Instructions by Cummins-Allison (Apr. 20, 1993).

Sale of JetScan Currency Scanner/Counter, Model 4061 (Apr. 20, 1993).

JetScan Currency Scanner/Counter, Model 4062, Operating Instructions by Cummins-Allison (Nov. 28, 1994).

Sale of JetScan Currency Scanner/Counter, Model 4062 (Nov. 18, 1994).

International Search Report; Application No. PCT/US01/04123; dated Sep. 13, 2001, 6 pgs.

Japanese Patent Office Official Gazette of Unexamined Patent Applications, Patent Application Publication No. 60-79487, Patent Application Publication Date May, 7, 1985.

Sales Brochure entitled "Why don't you select "Laurel" Friction Currency Counters F-2000 Series, the most advanced Models in the world!", 2 pages.

Friction Currency Counter FPAF-40 Instruction Manual, dated Jan., 1996, Ver. 1.000, Laurel Bank Machines Co., Ltd., 10 pages.

Friction Currency Counter FPAF-40 Instruction Manual, dated Jan., 1996, Ver. 1.000, Laurel Bank Machines Co., Ltd., 46 pages.

* cited by examiner

METHOD AND APPARATUS FOR DETECTING DOUBLED BILLS IN A CURRENCY HANDLING DEVICE

RELATED APPLICATIONS

The present application claims priority to the U.S. provisional patent applications METHOD AND APPARATUS FOR DETECTING DOUBLED BILLS IN A CURRENCY HANDLING DEVICE, Ser. No. 60/180,965, Filed on Feb. 8, 2000 and METHOD AND APPARATUS FOR DETECTING DOUBLED BILLS IN A CURRENCY HANDLING DEVICE, Ser. No. 60/181,752, filed on Feb. 11, 2000, both of which are incorporated herein by reference in their entirety.

FIELD OF THE INVENTION

The present invention relates generally to currency handling systems and, more particularly, relates to a method and apparatus for detecting doubled bills in a currency handling system.

BACKGROUND OF THE INVENTION

Some systems for counting, denominating, and for sorting documents such as paper currency require documents to be separated so that documents can be fed one by one along a transport path. If, however, documents get stuck to neighboring documents in a stack, it can become difficult or impossible to accurately count and/or sort individual documents.

A known method for determining whether a device is transporting a single document or doubled documents is to pass light through the document(s). Because doubled documents will generally not allow as much light through as single documents, a light sensor on the opposite side of the document from a light source will give a lower reading when doubled documents are encountered. This does not completely solve the problem, however. Because of the variations of cleanliness or dirtiness in individual bills, the transmitted light reading may be inaccurate. This is especially true in countries where the quality of circulated currency varies greatly. For example, an especially dirty bill may pass relatively little light through, thus appearing as two bills to the light sensor. Conversely, doubled bills that are especially clean or worn may let more light through than an average bill, giving the sensor the impression that a single bill is being transported. Thus, there exists a need for an system for detecting doubled bills that accounts for differences in the qualities of individual bills.

SUMMARY OF THE INVENTION

Accordingly, an object of the present invention is to provide an improved system for detecting when bills are being transported in a doubled or overlapping manner.

According to one embodiment of the present invention, a doubles detection system is provided which employs both reflected and transmitted light.

The reflected light system allows for more efficient doubles detection by comparing the light reflected off an individual document's surface to a master reflected light value for the specific document type. This is done by using light sources and photosensitive detectors along the same side of the document. The light source shines light on the document, and this light is reflected into the photosensitive detectors. Cleaner documents will generally reflect more light than dirtier documents. Further, cleaner documents will generally transmit more light through in the transmitted light detection step than dirtier bills.

The reflected light and transmitted light systems work together to determine whether a single or doubled bill is being handled. When the reflected light system shows a bill to be dirtier than the average bill (i.e., the bill reflects less light than an average bill), this information is conveyed to the transmitted light system which is then programmed to expect the bill to pass less light through than an average bill. Likewise, when the reflected light system shows a bill to be cleaner than the average bill, the transmitted light system uses this information to expect the bill to pass more light through than an average bill.

Without the reflected light system, a dirty bill could appear as two bills to the transmitted light system since it blocks more light. Using the reflected light system in conjunction with the transmitted light system reduces the chance of improperly indicating a single dirty bill constitutes two or more bills being transported in a doubled manner. A related problem could arise with clean bills. Two clean bills could appear to be one average bill to a transmitted light system Use of the reflected light system allows the transmitted light system to take these individual bill differences into account.

The average reflectance may be determined by a "learning" mode for the system in which the system tests a number of bills to arrive at an average value for the reflectance.

In one embodiment of a doubles detection system, the system comprises one or more light sources disposed on a first side of a test document; one or more reflected light sensors disposed along said first side of the test document, and adapted to detect one or more reflected light signals for the test document; a processor adapted to receive the reflected light signals of the test document and to convert the reflected light signals into reflected light values and further adapted to determine a ratio between the reflected light value of the test document and a master reflected light value; and transmitted light measurement system having a master transmitted light value modified by said ratio.

Figure 1:
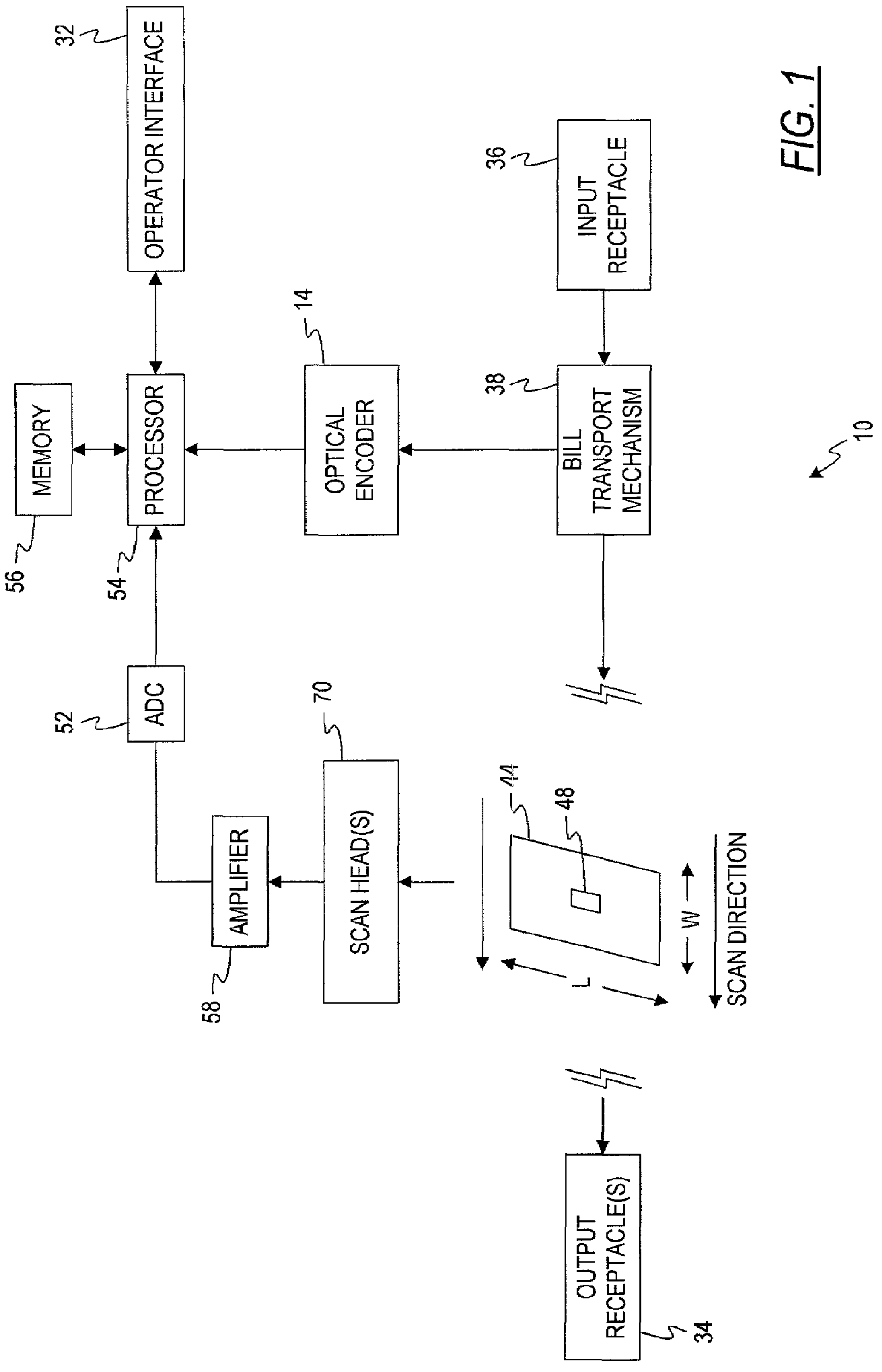
FIG. 1 is a functional block diagram of a currency handling system embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE EMBODIMENTS

A number of embodiments of currency handling systems which may employ doubles detection systems are described below. The doubles detection systems of the present invention may be used in connection with such systems. Likewise, the doubles detection systems of the present invention may be used in connection with a variety of document handling systems such as note counters, scanners, authenticators, denominators and/or sorters as well as for systems handling other types of documents such as checks, food stamps, and the like. In general, the doubles detection systems of the present invention may be used in connection with document handling systems in which documents are transported sequentially along a transport path and it is desired to determine whether more than a certain number of documents are being transported at a given time. For example, it may be important to determine whether more than one document at a time is being transported. For example, embodiments of the multiple document detection system of the present invention system may be employed to determine whether documents are being transported in an overlapping or doubled fashion. In particular, various embodiments of doubles or multiple document detection systems will be described in section III, below.

FIG. 1 illustrates in functional block diagram form the operation of a currency handling system according to some embodiments of the present invention. FIGS. 2–10 then illustrate various physical embodiments of currency handling systems that function as discussed in connection with FIG. 1 and that employ a doubles detection system.

Turning to FIG. 1, a currency handling system 10 comprises an input receptacle 36 for receiving a stack of currency bills to be processed. The processing may include evaluating, denominating, authenticating, and/or counting the currency bills. In addition to handling currency bills, the currency handling system 10 may be designed to accept and process other documents including but not limited to stamps, stock certificates, coupons, tickets, checks and other identifiable documents.

Bills placed in the input receptacle are transported one by one by a transport mechanism 38 along a transport path past one or more scanheads or sensors 70. The scanhead(s) 70 may perform magnetic, optical and other types of sensing to generate signals that correspond to characteristic information received from a bill 44. In some embodiments to be described below, the scanhead(s) 70 comprises a color scanhead. According to some embodiments, such as the embodiment shown in FIG. 1, the scanhead(s) 70 employs a substantially rectangularly shaped sample region 48 to scan a segment of each passing currency bill 44. After passing the scanhead(s) 70, each of the bills 44 is transported to one or more output receptacles 34 which may include stacking mechanisms to re-stack the bills 44.

According to some embodiments the scanhead(s) 70 generates analog output(s) which are amplified by an amplifier 58 and converted into a digital signal by means of an analog-to-digital converter (ADC) unit 52 whose output is fed as a digital input to a controller or processor 54 such as a central processing unit (CPU), a processor or the like. The processor 54 (such as a microprocessor) controls the overall operation of the currency handling system 10. In one embodiment an encoder 14, such as an optical encoder, linked to the bill transport mechanism 38 provides input to the processor 54 to determine the timing of the operations of the currency handling system 10. In this manner, the processor is able to monitor the precise location of bills as they are transported through the currency handling system.

The processor 54 is also operatively coupled to an internal or an external memory 56. The memory comprises one or more types of memories such as a random access memory ("RAM"), a read only memory ("ROM"), EPROM, or flash memory depending on the information stored or to be stored therein. The memory 56 may store software codes and/or data related to the operation of the currency handling system 10 and information for detecting doubled bills and denominating and/or authenticating bills.

An operator interface panel and display 32 provides an operator the capability of sending input data to, or receiving output data from, the currency handling system 10. Input data may comprise, for example, user-selected operating modes and user-defined operating parameters for the currency handling system 10. Output data may comprise, for example, a display of the operating modes and/or status of the currency handling system 10, the number or cumulative value of evaluated bills, and notification of doubled bills. In one embodiment, the operator interface panel 32 comprises a touch-screen "keypad" and display which may be used to provide input data and display output data related to operation of the currency handling system 10. Alternatively, the operator interface 32 may employ physical keys or buttons and a separate display or a combination of physical keys and displayed touch-screen keys. The interface may also include a printer.

According to some embodiments, a determination of authenticity or denomination of a bill under test is based on a comparison of scanned data associated with the test bill to the corresponding master data stored in the memory 56. For example, where the currency handling system 10 comprises a denomination discriminator, a stack of bills having undetermined denominations may be processed and the denomination of each bill in the stack determined by comparing data generated from each bill to prestored master information. If the data from the bill under test sufficiently matches master information associated with a particular denomination and bill-type stored in memory, a determination of denomination may be made.

The master information may comprise numerical data associated with various denominations of currency bills. The numerical data may comprise, for example, thresholds of acceptability to be used in evaluating test bills, based on expected numerical values associated with the currency or a range of numerical values defining upper and lower limits of acceptability. The thresholds may be associated with various sensitivity levels. The master information may also comprise pattern information associated with the currency such as, for example, optical or magnetic patterns.

Figure 2:
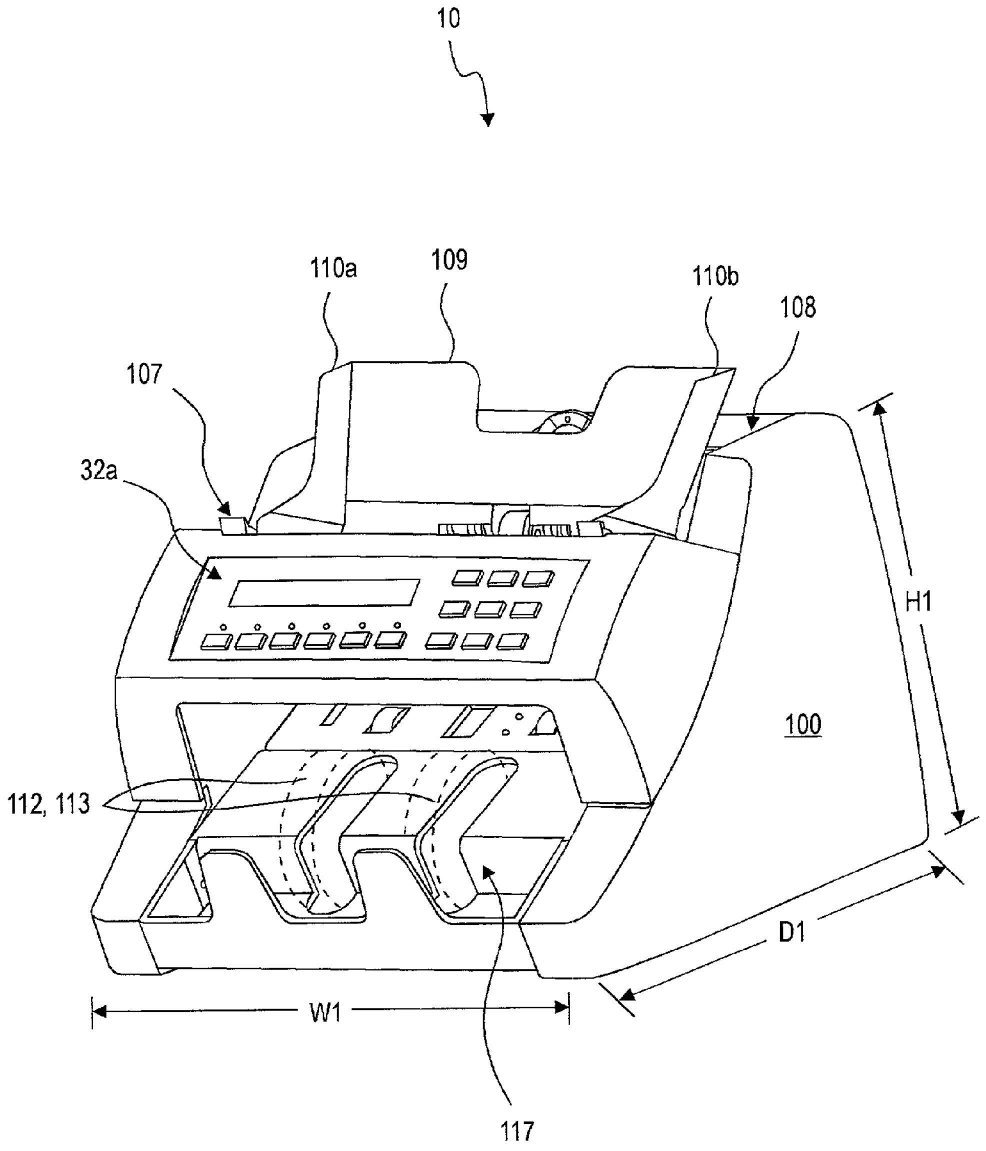
FIG. 2 is a perspective view of a single pocket currency handling system according to one embodiment of the present invention.
Figure 3:
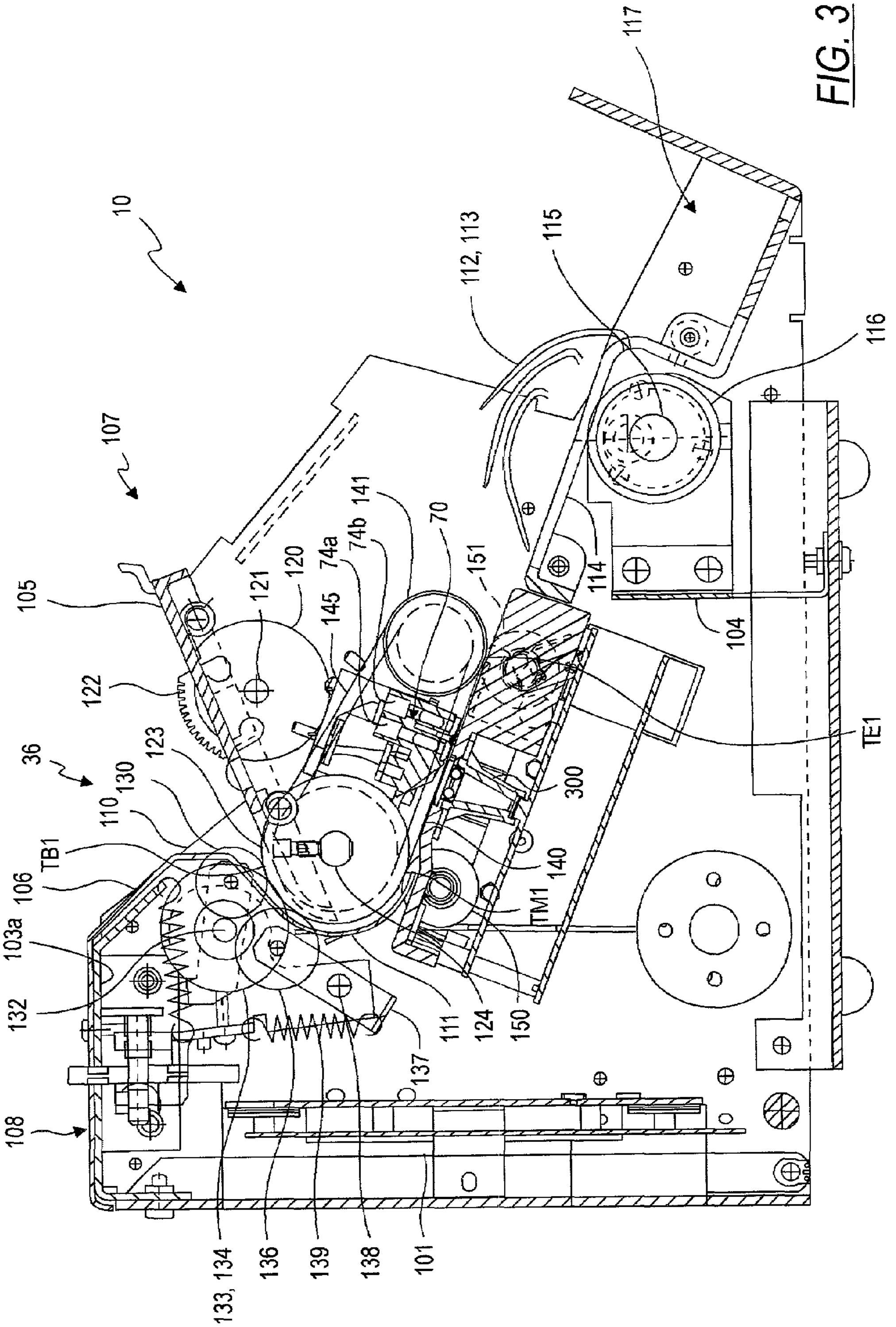
FIG. 3 is a sectional side view of the single pocket currency handling system of FIG. 2 depicting various transport rolls in side elevation.
Figure 4:
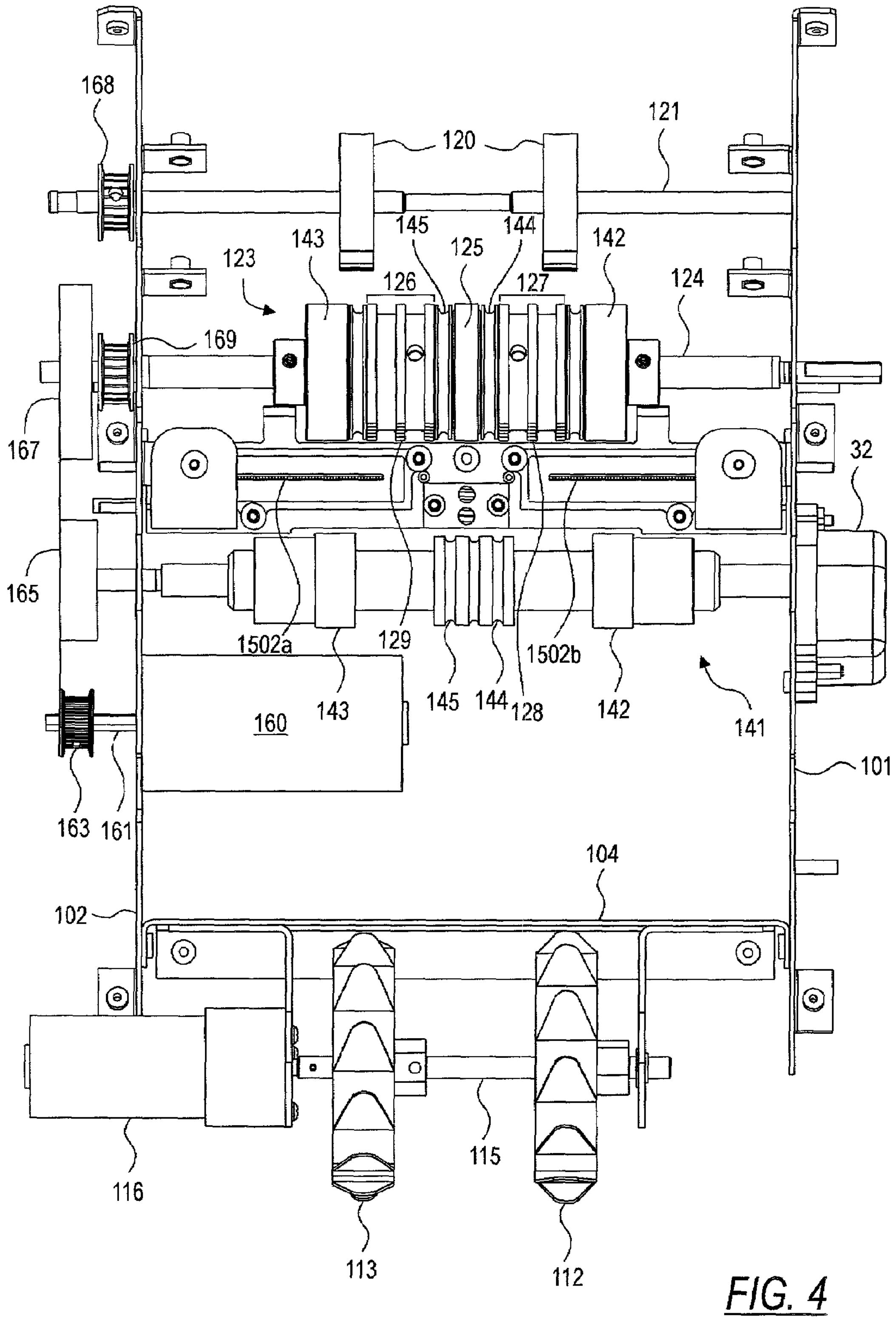
FIG. 4 is a top plan view of the interior mechanism of the system of FIG. 2 for transporting bills across a scanhead, and also showing the stacking wheels at the front of the system.
Figure 5:
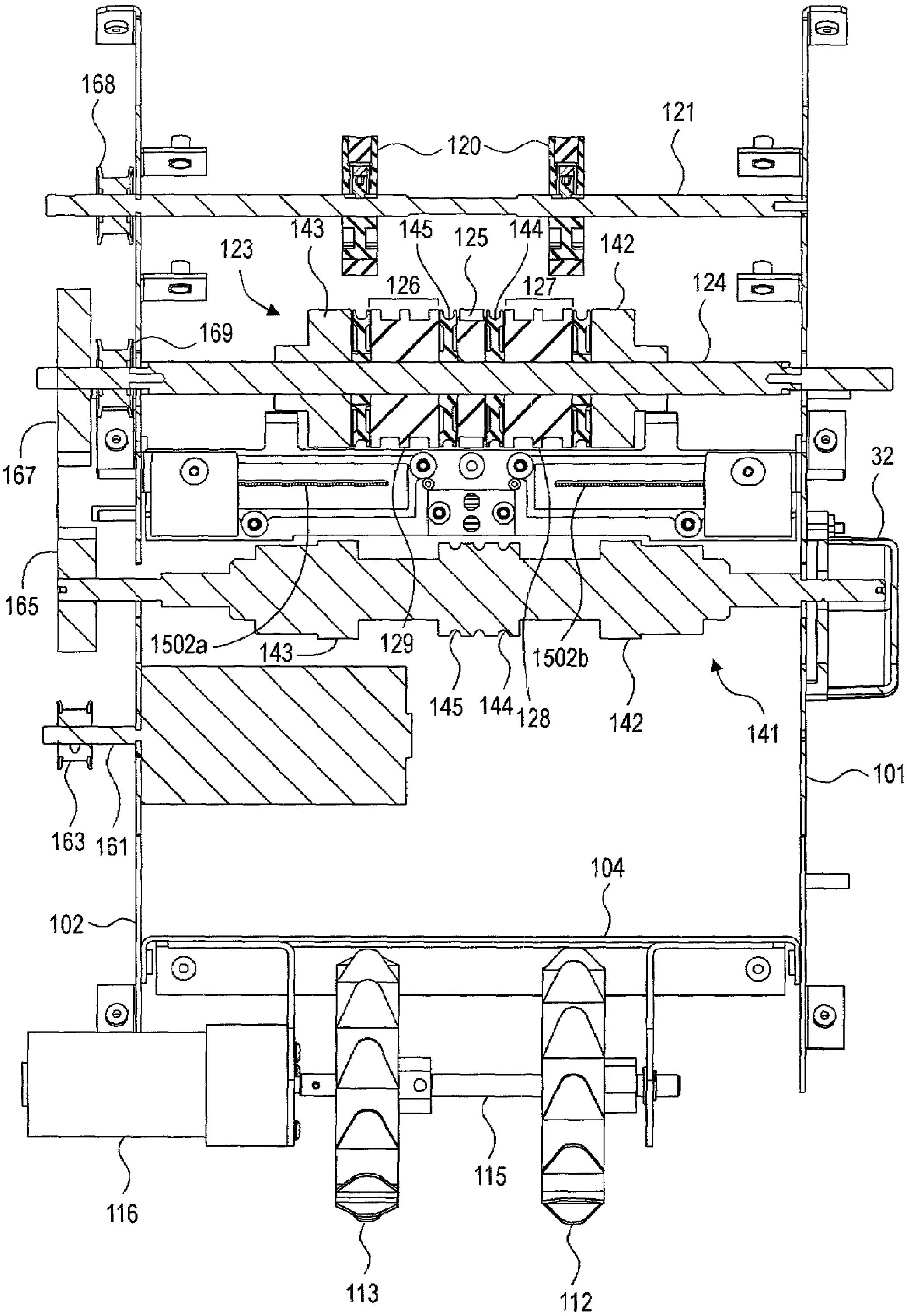
FIG. 5 is a sectional top view of the interior mechanism of the system of FIG. 2 for transporting bills across a scanhead, and also showing the stacking wheels at the front of the system.

Turning to FIGS. 2–5, FIG. 2 is a perspective view of a currency handling system 10 having a single output receptacle 117 according to one embodiment of the present invention. FIG. 3 is a sectional side view of the single pocket currency handling system of FIG. 2 depicting various transport rolls in side elevation and FIG. 4 is a top plan view of the interior mechanism of the system of FIG. 2 for transporting bills across a scanhead, and also showing the stacking wheels 112, 113 at the front of the system. In the single-pocket system 10, the currency bills are fed, one by one, from a stack of currency bills placed in the input receptacle 36 into a transport mechanism, which guides the currency bills past sensors to a single output receptacle 117. Single pocket currency handling systems and the mechanics thereof are described in greater detail in U.S. Pat. No. 5,687,963 entitled "Method and Apparatus for Discriminating and Counting Documents," and U.S. Pat. No. 5,295,196 entitled "Method and Apparatus for Currency Discriminating and Counting," both of which are assigned to the assignee of the present invention and incorporated herein by reference in their entirety. The physical embodiment of the currency handling system described in U.S. Pat. No. 5,687,963 including the transport mechanism and its operation is similar to that depicted in FIGS. 2–5 except for the scanhead arrangement and the use of a doubles detection system. The currency handling system of FIGS. 2–5 may employ a color scanhead 300 (FIG. 3) instead of or in addition to one of the standard scanheads 70 described in U.S. Pat. No. 5,687,963. The currency handling system of FIGS. 2–5 is designed to transport and process bills at a rate in excess of 800 bills per minute, preferably in excess of 1200 bills per minute.

As shown in FIG. 4, an encoder 32 is mounted on the shaft of the roller 141 for precisely tracking the position of each bill as it is transported through the system, as discussed in detail below in connection with the optical sensing and correlation technique. The encoder 32 also allows the system to be stopped in response to an error occurring or the detection of a "no call" bill. A system employing an encoder to accurately stop a scanning system is described in detail in U.S. Pat. No. 5,687,963, which is incorporated herein by reference in its entirety.

The single pocket currency system 10 described above in connection with FIGS. 2–5, is small and compact, such that it may be rested upon a tabletop or countertop. According to one embodiment, the single-pocket currency handling system 10 has a small size housing 100. The small size housing 100 provides a currency handling system 10 that occupies a small area or "footprint." The footprint is the area that the system 10 occupies on the table top and is calculated by multiplying the width (W1) and the depth (D1). Because the housing 100 is compact, the currency handling system 10 may be readily used at any desk, work station or teller station. Additionally, the small size housing 100 is light weight allowing the operator to move it between different work stations. According to one embodiment the currency handling system 10 has a height (H1) of about 9½ inches (24.13 cm), width (W1) of about 11 inches (27.94 cm), and a depth (D1) of about 12 inches (30.48 cm) and weighs approximately 15–20 pounds. In this embodiment, therefore, the currency handling system 10 has a "footprint" of about 11 inches by 12 inches (27.94 cm by 30.48 cm) or approximately 132 square inches (851.61 $cm^2$) which is less than one square foot, and a volume of approximately 1254 cubic inches (20,549.4 $cm^3$) which is less than one cubic foot. Accordingly, the system is sufficiently small to fit on a typical tabletop. The system is able to accommodate various currency, including German currency which is quite long in the X dimension (compared to U.S. currency). The width of the system is therefore sufficient to accommodate a German bill which is about 7.087 inches (180 mm) long. The system can be adapted for longer currency by making the transport path wider, which can make the overall system wider.

One of the contributing factors to the footprint size of the currency handling system 10 is the size of the currency bills to be handled. For example, in the embodiment described above, the width is less than about twice the length of a U.S. currency bill and the depth is less than about 5 times the width of a U.S. currency bill. Other embodiments of the single pocket currency handling system 10 have a height (H1) ranging from 7 inches to 12 inches, a width (W1) ranging from 8 inches to 15 inches, and a depth (D1) ranging from 10 inches to 15 inches and a weight ranging from about 10–30 pounds.

As best seen in FIG. 3, the currency handling system 10 has a relatively short transport path between the input receptacle and the output receptacle. The transport path beginning at point TB1 (where the idler roll 130 engages the drive roll 123) and ending at point TE1 (where the second driven transport roll 141 and the passive roll 151 contact) has an overall length of about 4½ inches. The distance from point TM1 (where the passive transport roll 150 engages the drive roll 123) to point TE1 (where the second driven transport roll 141 and the passive roll 151 contact) is somewhat less than 2½ inches, that is, less than the width of a U.S. bill. Thus, The distance from point TB1 (where the idler roll 130 engages the drive roll 123) to point TM1 (where the passive transport roll 150 engages the drive roll 123) is about 2 inches.

Figure 6:
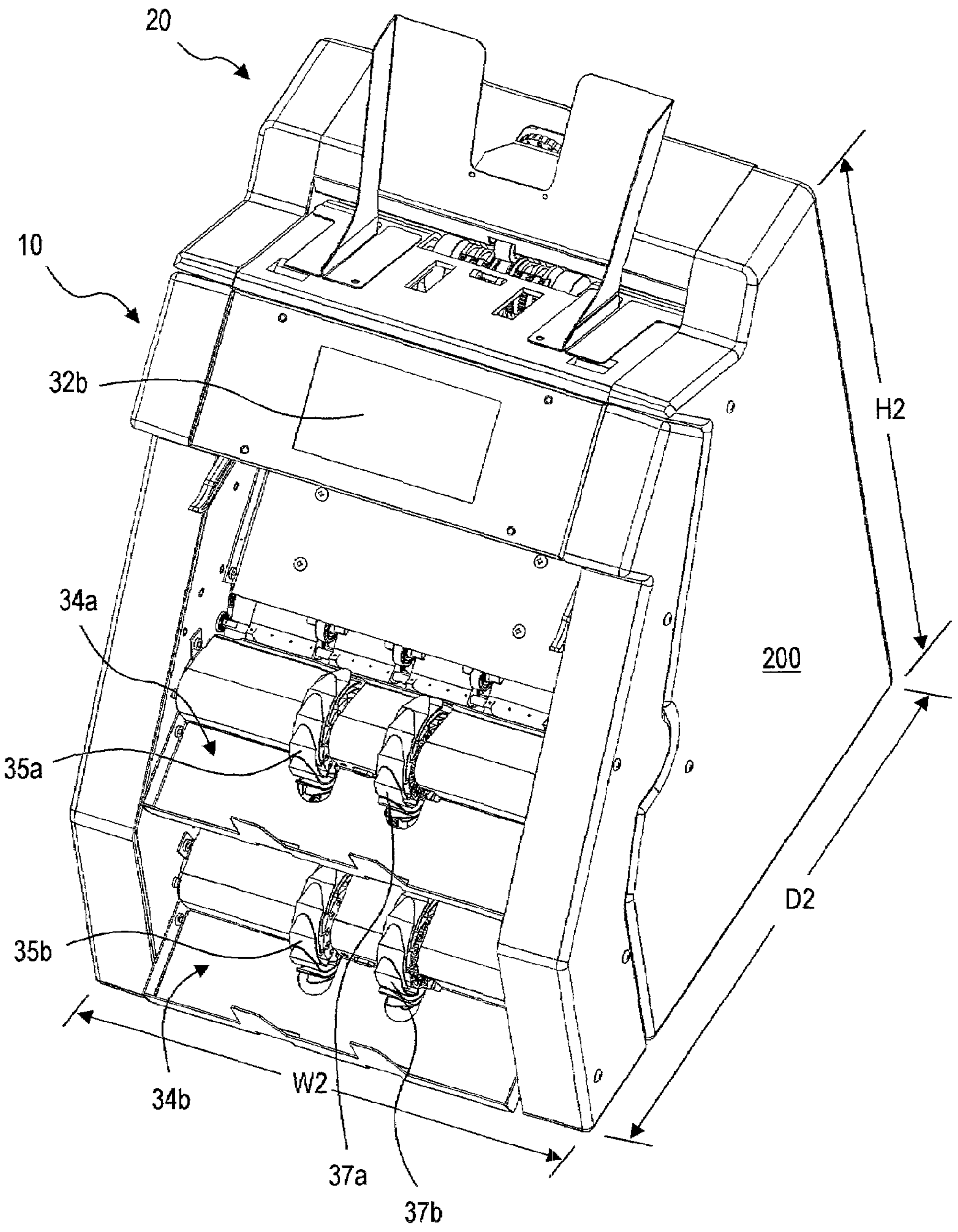
FIG. 6 is a perspective view of a two-pocket currency handling system according to one embodiment of the present invention.
Figure 7:
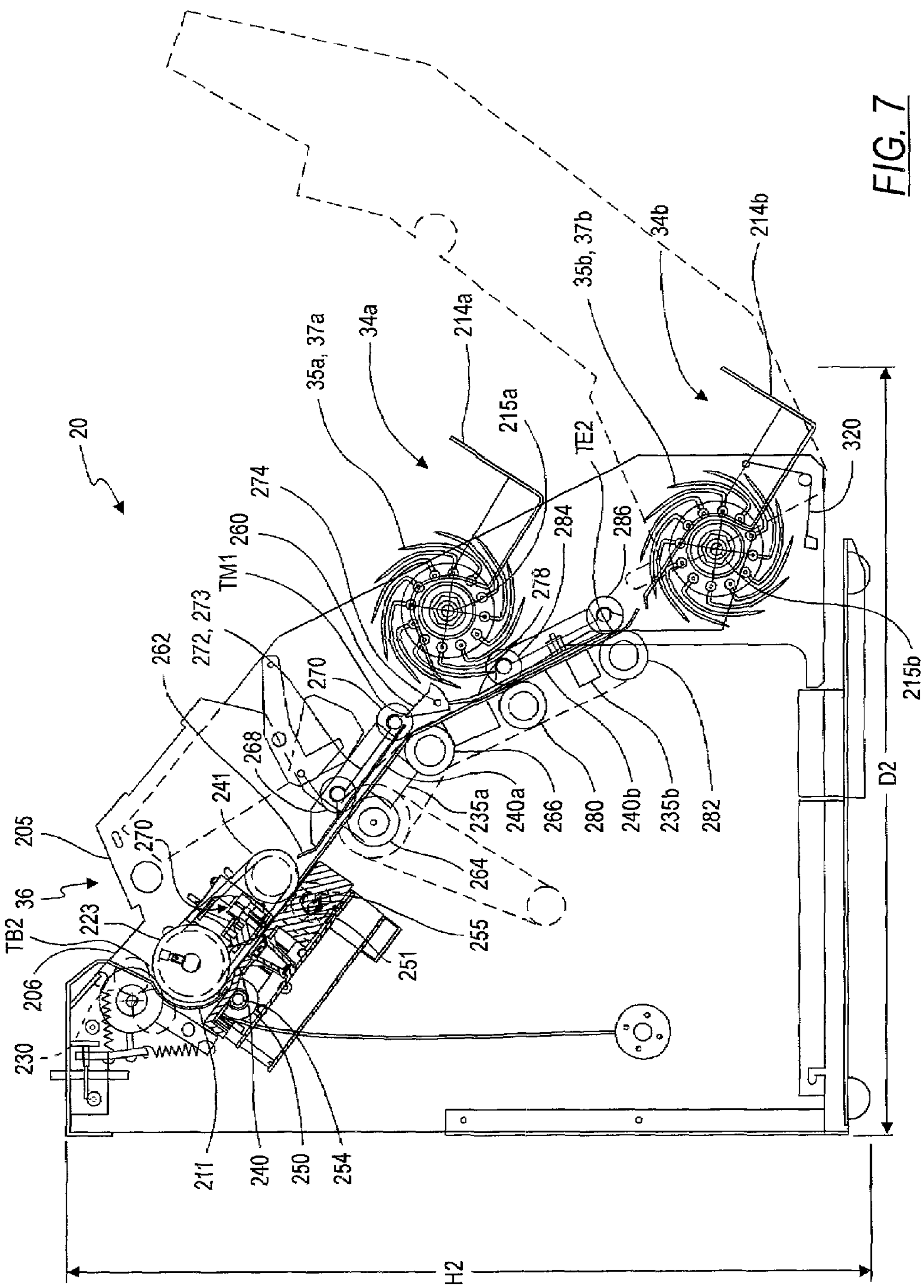
FIG. 7 is a sectional side view of the two-pocket currency handling system of FIG. 6 depicting various transport rolls in side elevation.

Turning to FIGS. 6 and 7, FIG. 6 is a perspective view of a two-pocket currency handling system 20 according to one embodiment of the present invention and FIG. 7 is a sectional side view of the two-pocket currency handling system of FIG. 6 depicting various transport rolls in side elevation. Furthermore, FIGS. 8, 9 and 10 portray other multi-pocket embodiments of the present invention in which the currency handling system includes three-, four- and six-pockets, respectively. Each of the multi-pocket embodiments shown respectively in FIGS. 6–7 and 8–10 is described in detail in co-pending U.S. patent application Ser. No. 08/864,423, filed May 28, 1997, entitled "Method and Apparatus for Document Processing", and published PCT application WO 97/45810, entitled "Method and Apparatus for Document Processing", Ser. No. 08/864,423 both of which are assigned to the assignee of the present invention and incorporated herein by reference in their entirety. The currency handling systems depicted in FIGS. 6–7 and 8–10 differ from the currency handling systems described in U.S. patent application Ser. No. 08/864,423 and PCT application WO 97/45810 in that the systems depicted in FIGS. 6–7 and 8–10 employ a color scanhead as described in detail below. The various doubles detection systems of the present invention may be employed in connection with any of these currency handling systems.

As with the single pocket currency system 10 described above in connection with FIGS. 2–5, the multi-pocket currency handling systems 20, 30, 40 and 60 shown in FIGS. 6–7 and 8–10 are small and compact, such that they may be rested upon a tabletop. In FIGS. 6–7 and 8–10, parts and components similar to those in the embodiments of FIGS. 2–5 are designated by similar reference numerals. For example, parts designated by 100 series reference numerals in FIGS. 2–5 are designated by similar 200 series reference numerals in FIGS. 6–7 and 8–10, while parts which we duplicated one or more times, are designated by like reference numerals with suffixes a, b, c, etc. The mechanical portions of the multi-pocket currency handling systems include a housing 200 having the input receptacle 36 for receiving a stack of bills to be processed. The receptacle 36 is formed by downwardly sloping and converging walls 205 and 206 (see FIG. 7) formed by a pair of removable covers (not shown) which snap onto a frame. The converging wall 206 supports a removable hopper (not shown) that includes vertically disposed side walls (not shown). One embodiment of an input receptacle was described and illustrated in detail above and applies to the multi-pocket currency handling systems 20, 30, 40, 60. The multi-pocket currency handling systems 20, 30, 40, 60 also include an operator interface **32*b* as described for the single pocket currency handling device 10**.

According to one embodiment, the two pocket currency handling system 20 enclosed within a housing 200 has a small footprint that may be readily used at any desk, work station or teller station. Additionally, the currency handling system is light weight allowing it to be moved between different work stations. According to one embodiment, the two-pocket currency handling system 20 has a height (H2) of about 18 inches, width (W2) of about 13½ inches, and a depth (D2) of about 17¼ inches and weighs approximately 70 pounds. Accordingly, the currency handling system 10 has a footprint of about 13½ inches by about 17 inches or approximately 230 square inches or about 1½ square feet and a volume of about 4190 cubic inches or slightly more than 2⅓ cubic feet, which is sufficiently small to conveniently fit on a typical tabletop.

Figure 8:
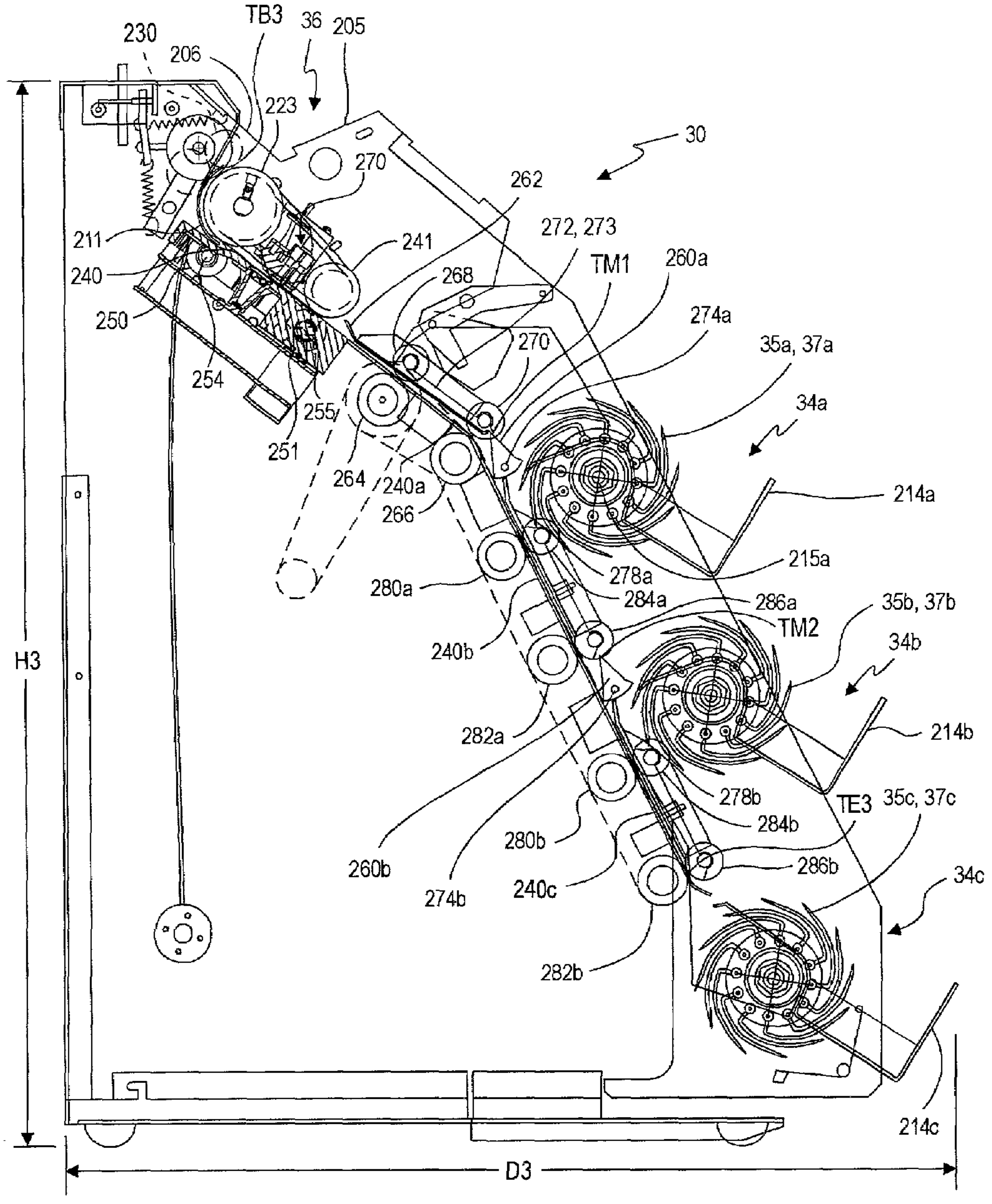
FIG. 8 is a sectional side view of a three-pocket currency handling system depicting various transport rolls in side elevation.
Figure 9:
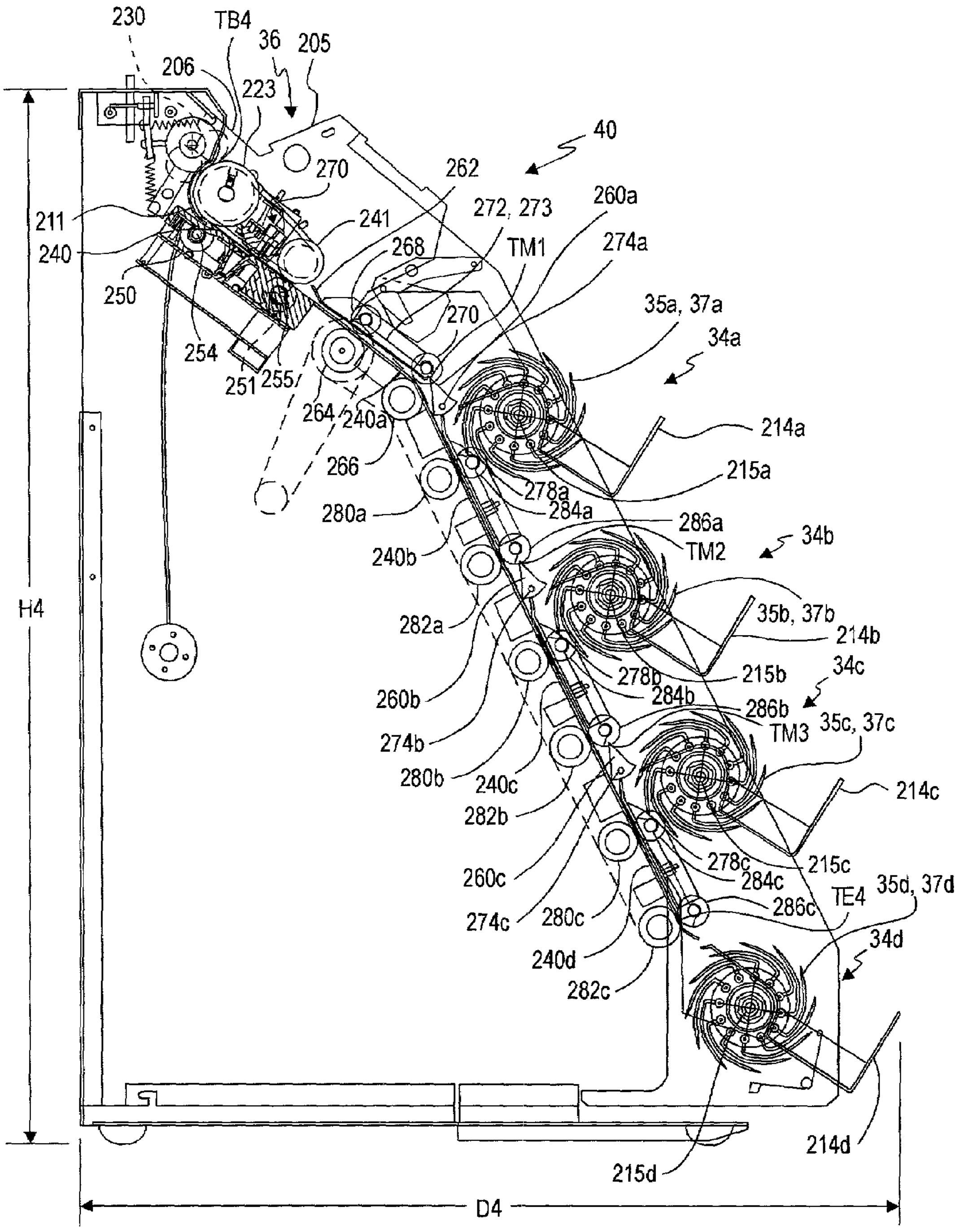
FIG. 9 is a sectional side view of a four-pocket currency handling system depicting various transport rolls in side elevation.
Figure 10:
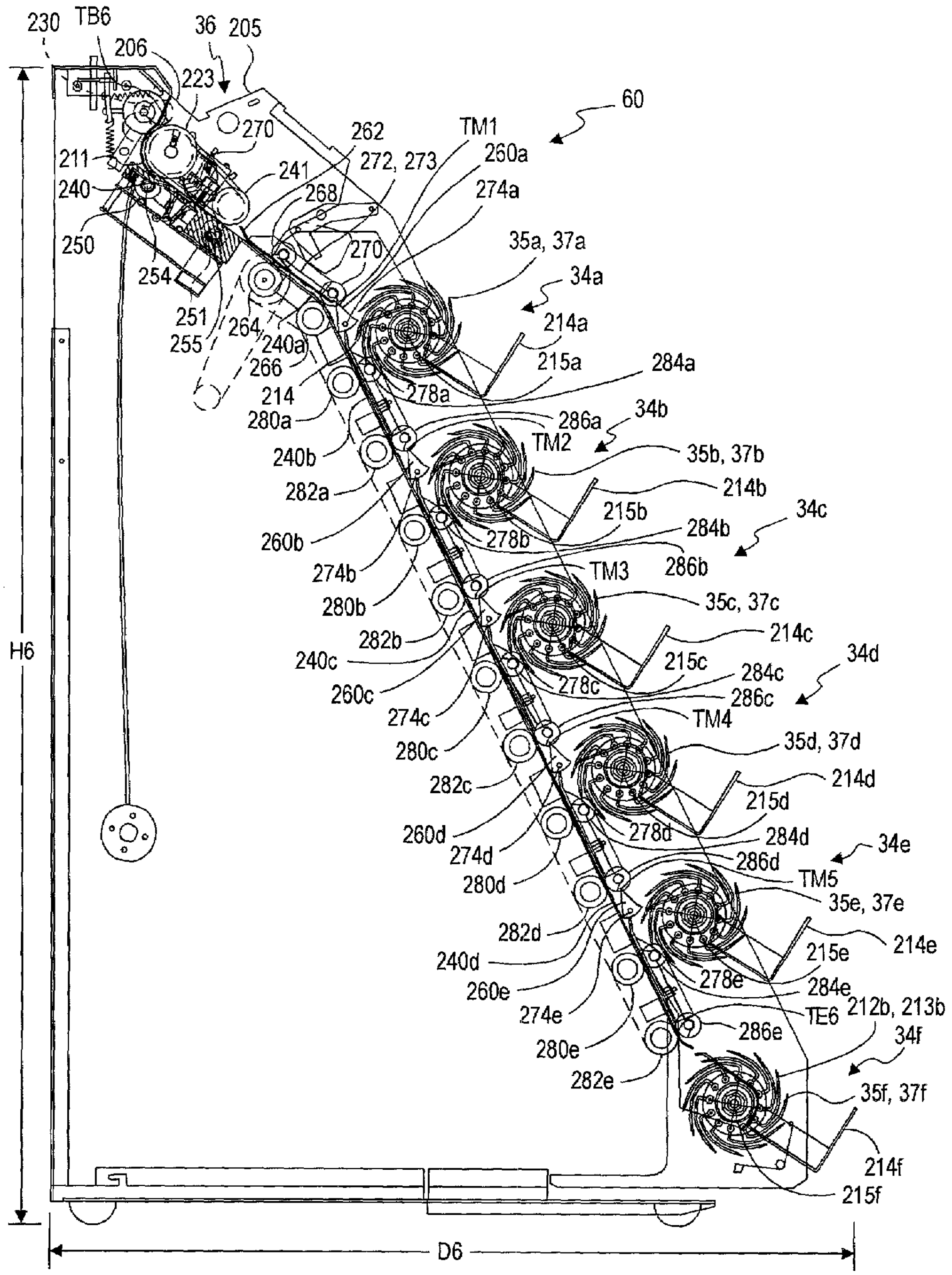
FIG. 10 is a sectional side view of a six-pocket currency handling system depicting various transport rolls in side elevation.

Similarly, the three-, four- and six-pocket systems 30, 40, 60 (FIGS. 8–10), in some embodiments, are constructed with generally the same footprint as the two pocket systems, allowing them to be rested upon a typical tabletop or countertop. Generally, however, where the three-, four- and six-pocket systems are constructed with the same footprint as the two-pocket system, they will be "taller" than the two-pocket system, with the relative heights of the respective systems corresponding generally to the number of pockets. Thus, in general, where the multi-pocket systems have approximately the same size footprint, the six-pocket system 60 (FIG. 10) will be taller than the four-pocket system 40 (FIG. 9), which in turn will be taller than the three-pocket system 30 (FIG. 8) and the two-pocket system 20 (FIGS. 6 and 7). As shown in FIGS. 8–10, the three, four and six pocket currency handling systems have the same width as the two pocket currency handling system shown in FIG. 6, namely, about 13½ inches. The three pocket currency handling system 30 of FIG. 8 has a height H3 of about 23 inches and a depth D3 of about 19¾ inches. The transport path of the three-pocket system has a length of about 10½ inches between the beginning of the transport path at point TB3 (where the idler roll 230 engages the drive roll 223) and the tip of the diverter **260*a* at point TM1, a length of about 16½ inches between the beginning of the transport path at point TB3 and the tip of the diverter 260*b* at point TM2, and has an overall length of about 21¼ inches from point TB3 to point TE3 (where the rolls 286*b* and 282*b*** contact).

According to another embodiment, the three pocket currency handling system has a height H3 ranging from 20–25 inches and a depth D3 ranging from 15–25 inches. The transport path of the three-pocket system has a length ranging from 8–12 inches between the beginning of the transport path at point TB3 (where the idler roll 230 engages the drive roll 223) and the tip of the diverter **260*a* at point TM1, a length ranging from 12–18 inches between the beginning of the transport path at point TB3 and the tip of the diverter 260*b* at point TM2, and has an overall length ranging from 18–25 inches from point TB3 to point TE3 (where the rolls 286*b* and 282*b*** contact).

The four pocket currency handling system 40 of FIG. 9 has a height H4 of about 28½ inches and a depth D4 of about 22¼ inches. The transport path of the four-pocket system has a length of about 10½ inches between the beginning of the transport path at point TB4 (where the idler roll 230 engages the drive roll 223) and the tip of the diverter **260*a* at point TM1, a length of about 16½ inches between the beginning of the transport path at point TB4 and the tip of the diverter 260*b* at point TM2, a length of about 22½ inches between the beginning of the transport path at point TB4 and the tip of the diverter 260*c* at point TM3, and an overall length of 27.193 inches from point TB4 to point TE4 (where the rolls 286*c* and 282*c*** contact).

In another embodiment, the four pocket currency handling system has a height H4 ranging from 25–30 inches and a depth D4 ranging from 20–25 inches. The transport path of the four-pocket system has a length ranging from 8–12 inches between the beginning of the transport path at point TB4 (where the idler roll 230 engages the drive roll 223) and the tip of the diverter **260*a* at point TM1, a length ranging from 12–20 inches between the beginning of the transport path at point TB4 and the tip of the diverter 260*b* at point TM2, a length ranging from 18–26 inches between the beginning of the transport path at point TB4 and the tip of the diverter 260***c* at point TM3, and an overall length ranging from 22–32 inches from point TB4 to point TE4 (where the rolls 286*c* and 282*c* contact).

The six pocket currency handling system 60 of FIG. 10 has a height H6 of about 39¼ inches and a depth D6 of about 27¼ inches. The transport path of the six-pocket system has a length of about 10½ inches between the beginning of the transport path at point TB6 (where the idler roll 230 engages the drive roll 223) and the tip of the diverter 260*a* at point TM1, a length of about 16½ inches between the beginning of the transport path at point TB6 and the tip of the diverter 260*b* at point TM2, a length of about 22½ inches between the beginning of the transport path at point TB6 and the tip of the diverter 260*c* at point TM3, a length of about 28¼ inches between the beginning of the transport path at point TB6 and the tip of the diverter 260*d* at point TM4, a length of about 34 inches between the beginning of the transport path at point TB6 and the tip of the diverter 260*e* at point TM5, and an overall length of about 39 inches from point TB6 to point TE6 (where the rolls 286*e* and 282*e* contact).

In another embodiment, the six pocket currency handling system has a height H6 ranging from 35–45 inches and a depth D6 ranging from 22–32 inches. The transport path of the six-pocket system has a length ranging from 8–12 inches between the beginning of the transport path at point TB6 (where the idler roll 230 engages the drive roll 223) and the tip of the diverter 260*a* at point TM1, a length ranging from 12–20 inches between the beginning of the transport path at point TB6 and the tip of the diverter 260*b* at point TM2, a length ranging from 18–26 inches between the beginning of the transport path at point TB6 and the tip of the diverter 260*c* at point TM3, a length ranging from 22–32 inches between the beginning of the transport path at point TB6 and the tip of the diverter 260*d* at point TM4, a length ranging from 30–40 inches between the beginning of the transport path at point TB6 and the tip of the diverter 260*e* at point TM5, and an overall length ranging from 32–42 inches from point TB6 to point TE6 (where the rolls 286*e* and 282*e* contact).

It will be appreciated that any of the stacker arrangements heretofore described may be utilized to receive currency bills, after they have been evaluated by the system. Without departing from the invention, however, the various doubles detection systems of the present invention may be employed in devices in which bills, rather than being transported from an input receptacle to an output receptacle(s), could be transported from an input receptacle past sensors, then in reverse manner delivered back to the input receptacle.

I. Scanning Region

Figure 11:
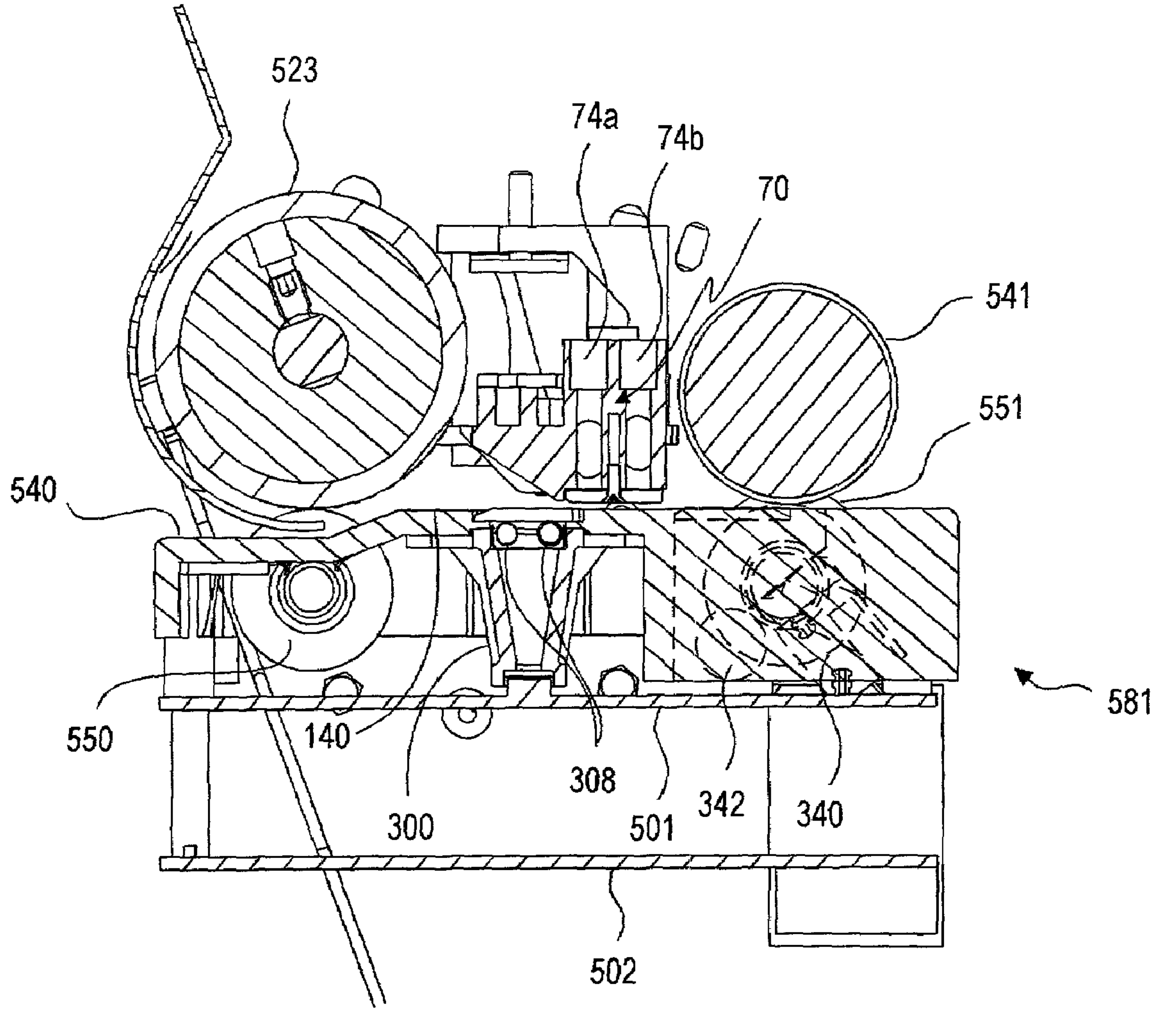
FIG. 11 is an enlarged sectional side view depicting the scanning region according to one embodiment of the present invention.

FIG. 11 is an enlarged sectional side view depicting the scanning region according to one embodiment of the present invention. According to various embodiments, this scanhead arrangement is employed in the currency handling systems described above in connection with FIGS. 1–10. According to the depicted embodiment, the scanning region along the transport path comprises both a standard optical scanhead 70 and a full color scanhead 300. Driven transport rolls 523 and 541 in cooperation with passive rolls 550 and 551 engage and transport bills past the scanning region in a controlled manner. The transport mechanics are described in more detail in U.S. Pat. No. 5,687,963. The standard scanhead 70 differs somewhat in its physical appearance from that described in U.S. Pat. No. 5,687,963 mentioned above and incorporated herein by reference in its entirety but otherwise is identical in terms of operation and function. The upper standard scanhead 70 is used to scan one side of bills while the lower full color scanhead 300 is used to scan the other side of bills. These scanheads are coupled to processors. For example, the upper scanhead 70 is coupled to a 68HC16 processor by Motorola of Schaumburg, Ill. The lower full color scanhead 300 is coupled to a TMS 320C32 DSP processor by Texas Instruments of Dallas, Tex. According to one embodiment that will be described in more detail below, when processing U.S. bills, the upper scanhead 70 is used in the manner described in U.S. Pat. No. 5,687,963 while the full color scanhead 300 is used in a manner described later herein.

In some embodiments of the doubles detection system of the present invention, the upper scanhead 70 and the full color scanhead 300 may serve to generate reflected and transmitted light signals. Alternatively, specialized doubles detection scanheads may be used instead of or in addition to the upper scanhead 70 and the full color scanhead 300.

Figure 12:
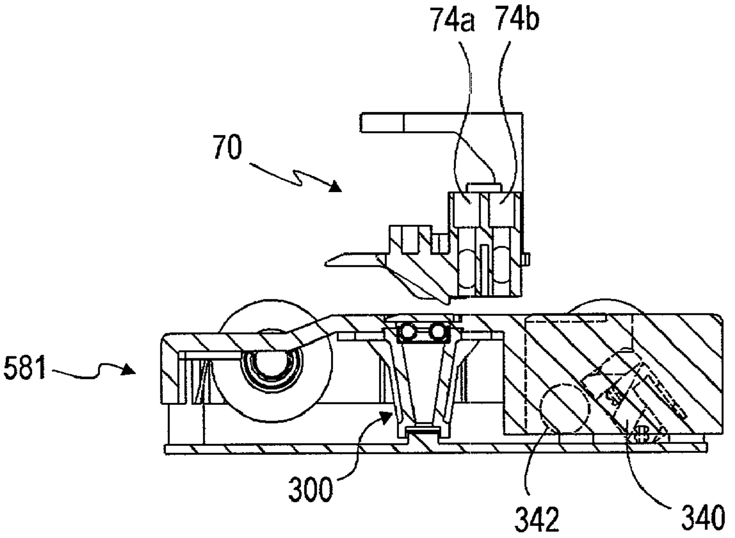
FIG. 12 is a sectional side view depicting the scanheads according to one embodiment of the present invention.
Figure 13:
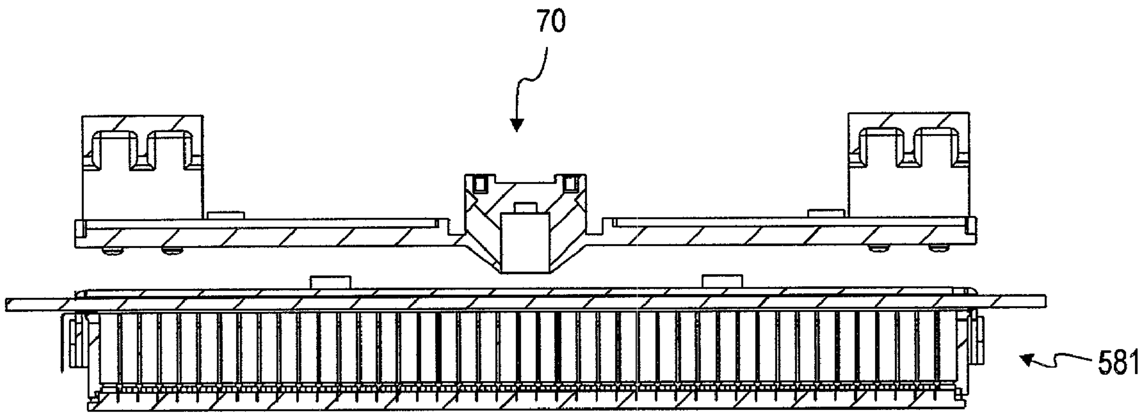
FIG. 13 is a front view depicting the scanheads of FIG. 12 according to one embodiment of the present invention.

FIG. 12 is an enlarged sectional side view depicting the scanheads of FIG. 11 without some of the rolls associated with the transport path. Again, depicted in this illustration, is the standard scanhead 70 and a color module 581 comprising the color scanhead 300 and an UV sensor 340 and its accompanying UV light tube 342. The details of how the UV sensor 340 operates are described in U.S. Pat. No. 5,640,463 and U.S. Pat. No. 5,960,103, which are incorporated herein by reference in their entirety. FIG. 13 illustrates the scanheads of FIGS. 11 and 12 in a front view.

A. Standard Scanhead

Figure 22:
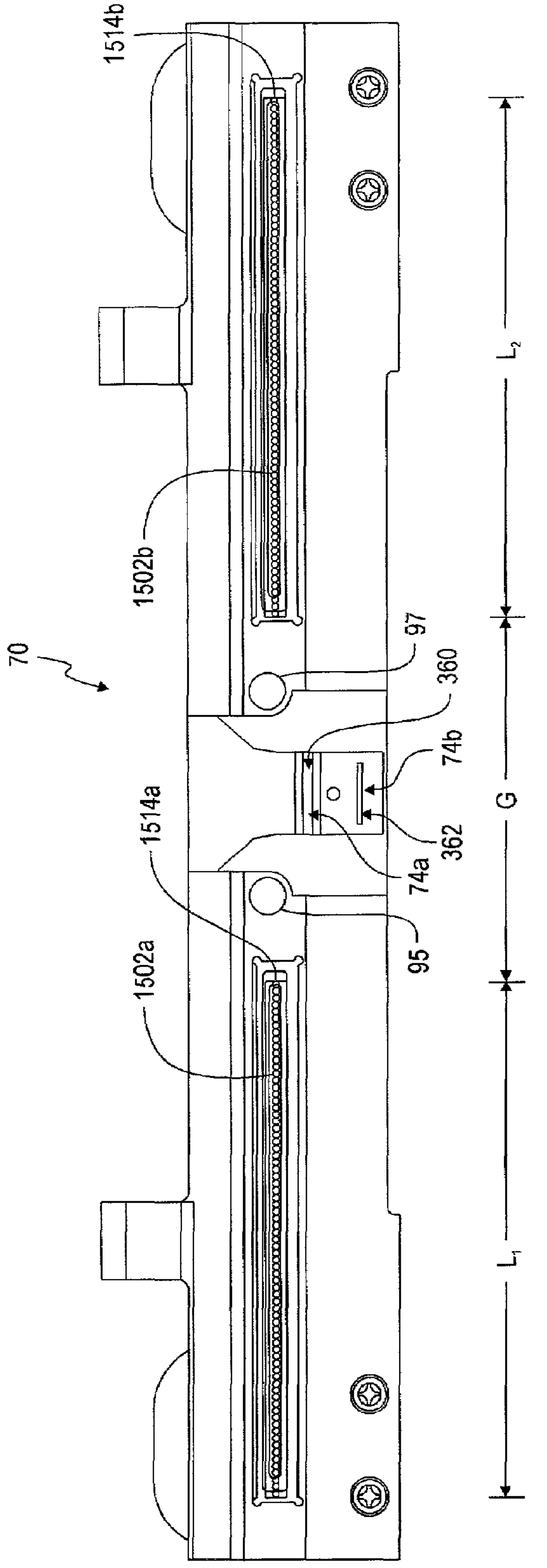
FIG. 22 is a bottom view of the standard scanhead of FIG. 21.
Figure 23:
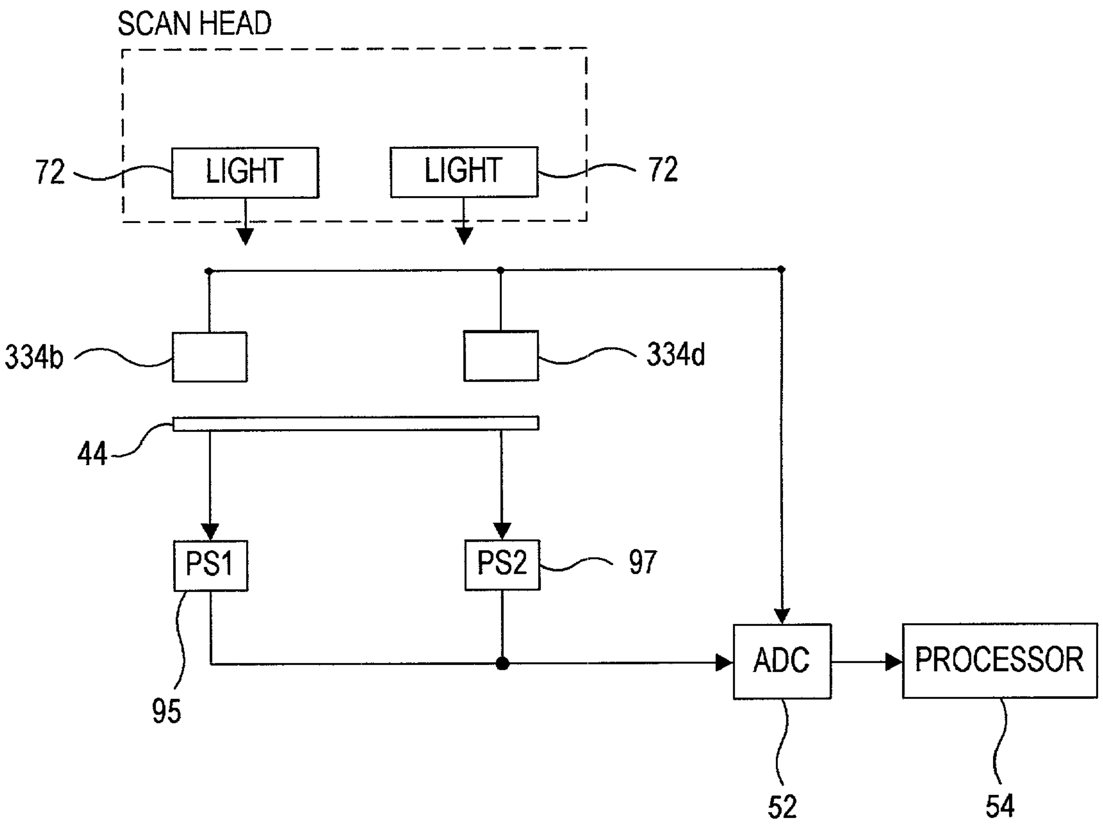
FIG. 23 is a functional block diagram of a fold/hole and doubles detection system.

According to one embodiment, the standard scanhead includes two standard photodetectors 74*a* and 74*b* (see FIGS. 11 and 12) and two photodetectors 95 and 97 (the density sensors), illustrated in FIG. 23. Two light sources are provided for the photodetectors as described in more detail in U.S. Pat. No. 5,295,196 incorporated herein by reference in its entirety. The standard scanhead employs a mask having two rectangular slits 360 and 362 (see FIG. 22) therein for permitting light reflected off passing bills to reach the photodetectors 74*a* and 74*b*, which are behind the slits 360, 362, respectively. One photodetector 74*b* is associated with a narrow slit 362 and may optionally be used to detect the fine borderline present on U.S. currency, when suitable cooperating circuits are provided. The other photodetector 74*a* associated with a wider slit 360 may be used to scan the bill and generate optical patterns used in the discrimination process.

Figure 15:
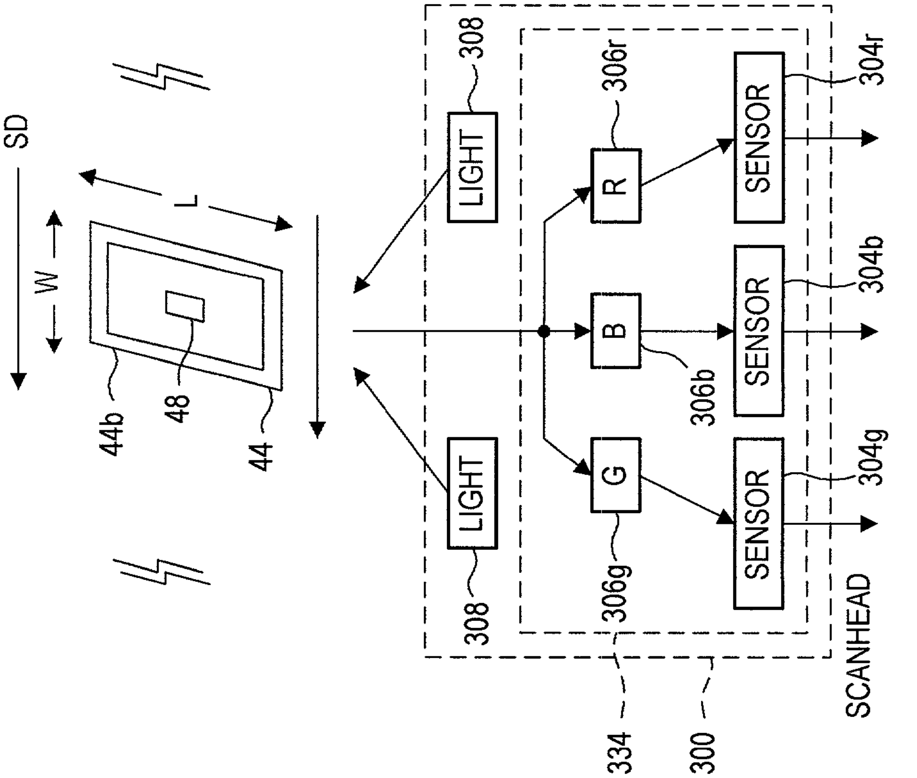
FIG. 15 is a functional block diagram of a full color scanhead.
Figure 14:
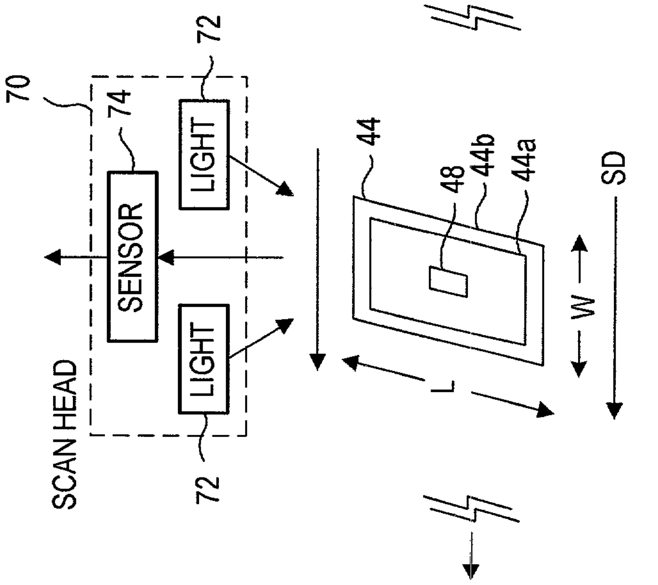
FIG. 14 is a functional block diagram of a standard optical scanhead.
Figure 21:
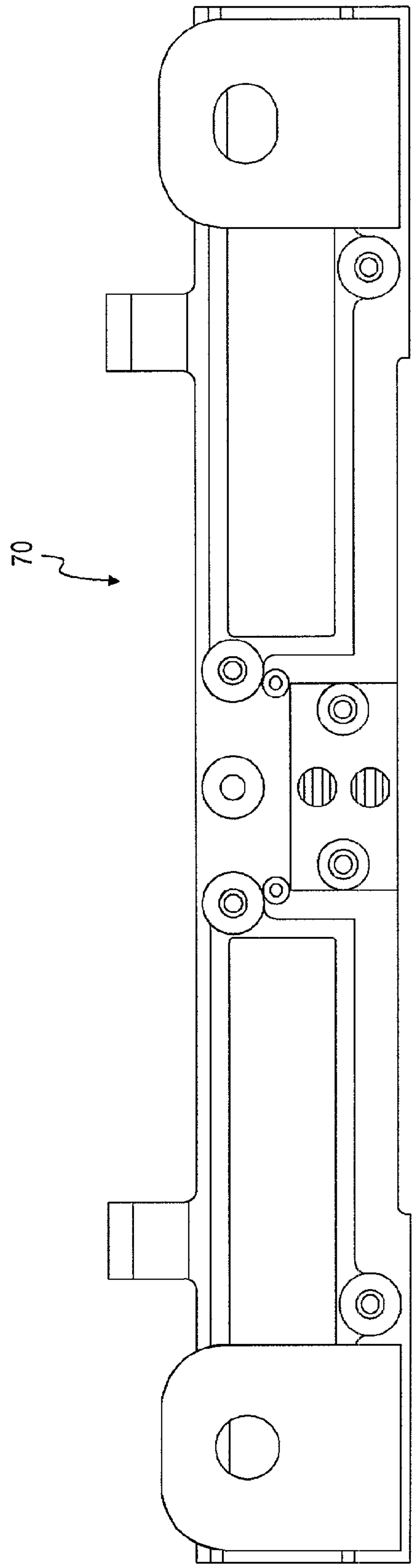
FIG. 21 is a top view of a standard for use in some embodiments of the present invention.

FIG. 14 is a functional block diagram of the standard optical scanhead 70, and FIG. 15 is a functional block diagram of the full color scanhead 300 of FIG. 11. The standard scanhead 70, shown in FIG. 21 is an optical scanhead that scans for characteristic information from a currency bill 44. According to one embodiment, the standard optical scanhead 70 includes a sensor 74 having, for example, two photodetectors each having a pair of light sources 72 directing light onto the bill transport path so as to illuminate a substantially rectangular area 48 upon the surface of the currency bill 44 positioned on the transport path adjacent the scanhead 70. As illustrated in FIG. 22 one of the photodetectors 74*b* is associated with a narrow rectangular slit 362 and the other photodetector 74*a* is associated with a wider rectangular slit 360. Light reflected off the illuminated area 48 is sensed by the sensor 74 positioned between the two light sources 72. The analog output of the photodetectors 74 is converted into a digital signal by means of the analog-to-digital (ADC) converter unit 52 (FIG. 23) whose output is fed as a digital input to the central processing unit (CPU) 54 as described above in connection with FIG. 1. Alternatively, especially in embodiments of currency handling systems designed to process currency other than U.S. currency, a single photodetector 74*a* having the wider slit 360 may be employed without photodetector 74*b*.

According to one embodiment, the bill transport path is defined in such a way that the transport mechanism 38 (FIG. 1) moves currency bills with the narrow dimension of the bills being parallel to the transport path and the scan direction SD. As a bill 44 traverses the scanhead 70, the illuminated area 48 moves to define a coherent light strip which effectively scans the bill across the narrow dimension (W) of the bill. In the embodiment depicted, the transport path is so arranged that a currency bill 44 is scanned across a central section of the bill along its narrow dimension. The scanhead functions to detect light reflected from the bill 44 as the bill 44 moves past the scanhead 70 to provide an analog representation of the variation in reflected light, which, in turn, represents the variation in the dark and light content of the printed pattern or indicia on the surface of the bill 44. This variation in light reflected from the narrow dimension scanning of the bills serves as a measure for distinguishing, with a high degree of confidence, among a plurality of currency denominations which the system is programmed to handle. The standard optical scanhead 70 and standard intensity scanning process is described in detail in U.S. Pat. No. 5,687,963 entitled "Method and Apparatus for Discriminating and Counting Documents," assigned to the assignee of the present invention and incorporated herein by reference in its entirety.

Referring to, for example, FIG. 14, for use in a doubles detection system according to some embodiments of the present invention, the scanhead 70 may also generate a reflected light signal corresponding to the total amount of reflected light detected by the scanhead 70. Likewise, a second scanhead 70*a* (not shown) may be disposed on the side of the bill 44 opposite the light sources 72 to generate a transmitted light signal corresponding to the total amount of transmitted light detected by the second scanhead 70*a*. The second scanhead 70*a* may be provided with no light sources or with disabled light sources, so that only a transmitted light signal is generated for the side of the bill having the second scanhead 70*a*. Similarly, referring to FIG. 15, a color scanhead 300 may be used as a reflected or transmitted light sensor. The operation of the color scanhead 300 is described in section B, below. If the color scanhead 300 is used as a reflected light sensor, light sources 308 may be enabled, while if the color scanhead 300 is used as a transmitted light sensor, light sources 308 may be disabled.

The standard optical scanhead 70 produces a series of detected reflected light and/or transmitted light signals across the narrow dimension of the bill, or across a selected segment thereof, and the resulting analog signals are digitized under control of the processor 54 to yield a fixed number of digital reflected light data samples. Alternatively, reflected light and/or transmitted light signals may be generated corresponding to several different bill regions. The data samples may then be subjected to a normalizing routine for processing the sampled data for improved correlation and for smoothing out variations due to "contrast" fluctuations in the printed pattern existing on the bill surface. In one embodiment, the normalized reflected light data represents a characteristic pattern that is unique for a given bill denomination and provides sufficient distinguishing features among characteristic patterns for different currency denominations. Alternatively, the reflected light data may not represent a pattern but rather simply reflects the overall amount of light that was reflected onto the scanhead sensors 74, 74*a*, 300, or 300*a*.

Details of various embodiments of sampling processes are described in more detail in published PCT patent application WO 97/45810. Further details maybe found in U.S. patent application Ser. No. 09/197,250, entitled "Color Scanhead and Currency Handling System Employing the Same," published PCT patent application WO 99/48042, entitled "Color Currency Scanner," and U.S. patent application Ser. No. 09/268,175, entitled "Color Scanhead and Currency Handling System Employing the Same," all of which are incorporated herein by reference in their entirety.

B. Full Color Scanhead

Returning to FIG. 15, there is shown a functional block diagram of one cell 334 of the color scanhead 300 according to one embodiment of the present invention. As will be described in more detail below, the color scanhead may comprise a plurality of such cells. The illustrative cell includes a pair of light sources 308 (e.g. fluorescent tubes) directing light onto the bill transport path. A single light source, e.g., single fluorescent tube or other light source, could be used without departing from the invention. The light sources 308 illuminate a substantially rectangular area 48 upon a currency bill 44 to be scanned. The cell comprises three filters 306 and three sensors 304. Light reflected off the illuminated area 48 passes through filters 306*r*, 306*b* and 306*g* positioned below the two light sources 308. Each of the filters 306*r*, 306*b* and 306*g* transmits a different component of the reflected light to corresponding sensors or photodiodes 304*r*, 304*b* and 304*g*, respectively.

In one embodiment, the filter 306*r* transmits only a red component of the reflected light, the filter 306*b* transmits only a blue component of the reflected light and the filter 306*g* transmits only a green component of the reflected light to the corresponding sensors 304*r*, 304*b* and 304*g*, respectively. Details of the various embodiments of full color scanheads are described in more detail in PCT application WO 99/48042, which is incorporated herein by reference in its entirety.

Upon receiving their corresponding color components of the reflected light, the sensors 304*r*, 304*b* and 304*g*generate red, blue and green analog outputs, respectively, representing the variations in red, blue and green color content in the bill 44. These red, blue and green analog outputs of the sensors 304*r*, 304*b* and 304*g*, respectively, are amplified by the amplifier 58 (FIG. 1) and converted into a digital signal by the analog-to-digital converter (ADC) unit 52 whose output is fed as a digital input to the central processing unit (CPU) 54 as described above in conjunction with FIG. 1.

Similar to the operation of the standard optical scanhead 70 embodiment described above, the bill transport path may be defined in such a way that the transport mechanism 38 moves currency bills with the narrow dimension of the bills being parallel to the transport path and the scan direction. The color scanhead 300 functions to detect light reflected from the bill as the bill moves past the color scanhead 300 to provide an analog representation of the color content in reflected light, which, in turn, represents the variation in the color content of the printed pattern or indicia on the surface of the bill. The sensors 304*r*, 304*b* and 304*g* generate the red, blue and green analog representations of the red, blue and green color content of the printed pattern on the bill. This color content in light reflected from the scanned portion of the bills may serve as a measure for distinguishing among a plurality of currency types and denominations which the system is programmed to handle. In some embodiments, the color scanhead 300 may be used in a doubles detection system to detect the total amount of light incoming throughout the range of detected colors, and thereby to generate reflected light or transmitted light signals for documents.

II. Brightness Normalizing Technique

A simple normalizing procedure may be utilized for processing raw test brightness samples into a form which is conveniently and accurately compared to corresponding master brightness samples stored in an identical format in memory 56. More specifically, as a first step, the mean value $\overline{X}$ for the set of test brightness samples (containing "n" samples) is obtained for a bill scan as below:

$$\overline{X} = \sum_{i=0}^{n} \frac{X_i}{n}$$

Subsequently, a normalizing factor Sigma ("s") is determined as being equivalent to the sum of the square of the difference between each sample and the mean, as normalized by the total number n of samples. More specifically, the normalizing factor is calculated as below:

$$\sigma = \sum_{i=0}^{n} \frac{|X_i - \overline{X}|^2}{n}$$

In the final step, each raw brightness sample is normalized by obtaining the difference between the sample and the above-calculated mean value and dividing it by the square root of the normalizing factor σ as defined by the following equation:

$$X_n = \frac{X_i - \overline{X}}{(\sigma)^{1/2}}$$

III. Other Sensors

Other sensors, in addition to the optical and color scanheads described above, such as magnetic sensors, size detection sensors, and fold/hole detection sensors may be incorporated into a currency handling system such as described above. Such sensors are described in more detail in PCT application WO 99/48042.

Doubles Detection

Figure 17:
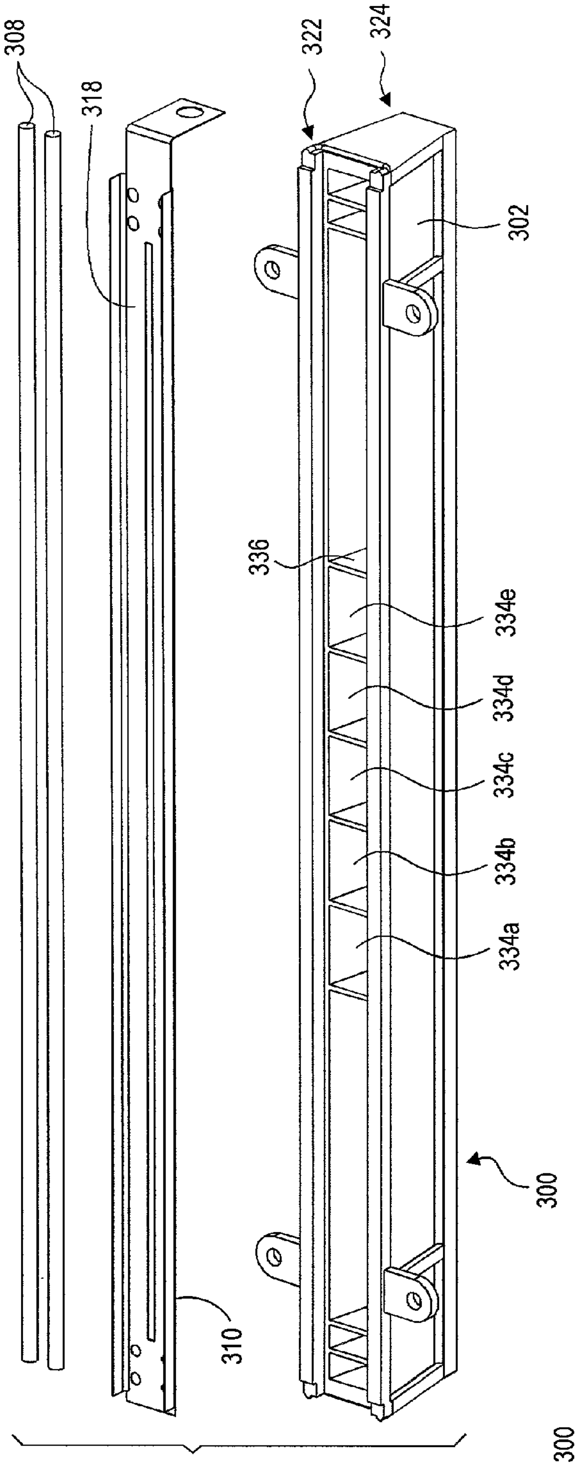
FIG. 17 is a top perspective view of one embodiment of a color scanhead for use in some embodiments of the present invention.

According to some embodiments, doubling or overlapping of documents, such as bills, is aided by transmitted light sensors PS1 and PS2, such as the "Y" sensors 95, 97 (shown in FIG. 23). In some embodiments, the transmitted light sensors PS1 and PS2, are located on a common transverse axis that is perpendicular to the direction of document flow. For use in doubles detection, the transmitted light sensors PS1 and PS2 are placed along a side of a bill such that light must be transmitted through the bill to reach the transmitted light sensors PS1 and PS2. In some embodiments, the transmitted light sensors PS1 and PS2 comprise photosensors positioned directly opposite a pair of light sources on the other side of the bill, such as the light sources 308 of the color scanhead illustrated in FIG. 17. The transmitted light sensors PS1 and PS2 detect transmitted light from the light sources 308 and generate analog outputs which correspond to the amount of transmitted light that passes through the bill. Each such output is converted into a digital signal by a conventional ADC converter unit 52 whose output is fed as a digital input to and processed by the system processor 54.

The presence of a bill adjacent the transmitted light sensors PS1 and PS2 causes a change in the intensity of the detected light, and the corresponding changes in the analog outputs of the transmitted light sensors PS1 and PS2 serve as a convenient means for density-based measurements for detecting the presence of "doubles" (two or more overlaid or overlapped bills) encountered during the currency scanning process. For instance, the transmitted light sensors may be used to collect a predefined number of density measurements on a test bill, and the average density value for a bill may be compared to predetermined density thresholds (based, for instance, on standardized density readings for master bills) to determine the presence of overlaid bills or doubles. The predetermined thresholds may be embodied in one or more master transmitted light values.

A master transmitted light value, which corresponds to the density of a bill, may be input manually, gleaned from a series of master bills, or averaged out over a series of bills. This master transmitted light value serves as the basis for comparison with the transmitted light values of tested bills.

Figure 16:
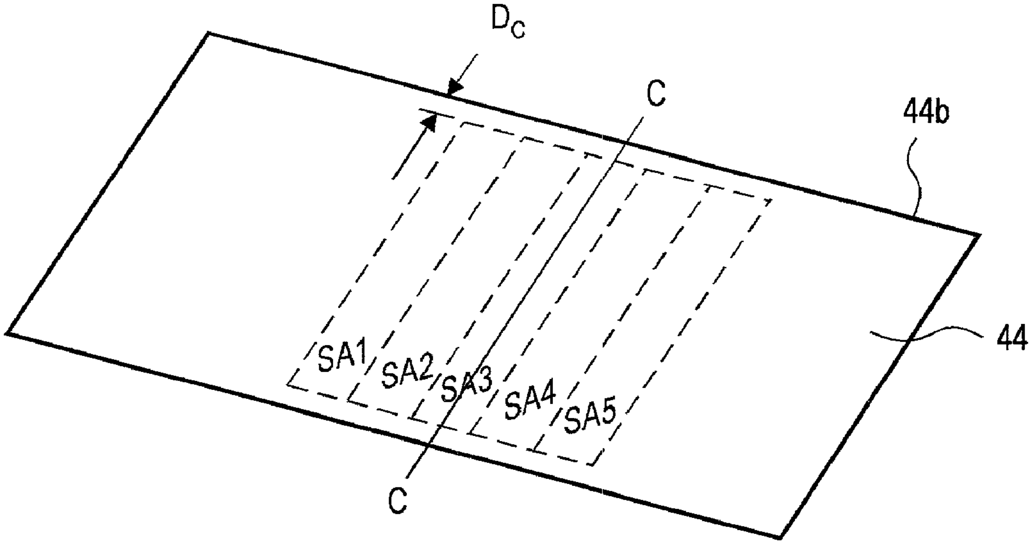
FIG. 16 is a perspective view of a bill and a plurality areas to be color scanned on the bill.

According to some embodiments, detection of overlaid bills or doubles is aided by the use of a reflected light measurement. For example, as a bill 44 passes by the color scanhead 300, a reflected light measurement of the bill may be taken. In one embodiment, reflected light measurements are taken along scan areas SA2 and SA4 (see FIG. 16) by scanhead cells 334*b* and 334*d* (shown in FIG. 18). In some embodiments, reflected light measurements are taken by separate cells not on the scanhead. The reflected light measurements are a measurements of the intensity of light reflected off a bill 44 to reflected light sensors, such as the scanhead cells 334*b* and 334*d*. A higher intensity measurement corresponds with a greater amount of reflected light at the corresponding scan area, and a lower intensity measurement corresponds with a lower amount of reflected light at the corresponding scan area. The reflected light information may be used as a measurement of the condition of a bill. Factors which may change the amount of reflected light include how clean, dirty, worn out, or inky each bill is. 27. A method is provided for analyzing documents in a document handling device comprising sensing reflected light from a first side of a test document, calculating a reflectance ratio based on a master reflected light value and the reflected light from the test document, and adjusting a master transmitted light value based on the reflectance ratio. This method may be used with currency bills, and the method may include identifying a type or denomination of the document before, after, or while analyzing the document using transmitted and reflected light.

Master Reflected Light Information

According to some embodiments, master reflected light information can be determined in a "learning" mode. In a learning mode, a currency handling device may process a number of bills of a certain type to determine master values. Alternatively, a single bill could be processed one or more times to determine master values. Learning is discussed in more detail in section IV below, but briefly, if, for example, 100 bills of a given type are passed through a currency handling system in a learning mode, the master reflected light value can be determined as:

$$R_{Master} = \frac{\sum R_{Individual}}{100}$$

where $R_{master}$ is the master reflected light value for the bill type; and $\Sigma R_{individual}$ represents a summation of the individual reflected light measurements taken for each bill. A separate master value could be calculated for each relevant scanhead cell, or a single average might represent combined readings from all scanhead cells utilized. For example, if each bill is sampled by two reflected light sensors, the master reflected light value can be calculated by summing all reflected light values (two for each bill) and dividing this sum by twice the number of bills. Once a master reflected light value for a specific type of bill is determined, this value can be used in detecting doubles during normal operation.

Normal Operation

In normal operation, according to some embodiments bills are expected to be transported one by one along a transport path past sensors including one or more doubles detection sensors. According to one embodiment, as bills pass transmitted light sensors PS1 and PS2 and reflected light sensors 334*b* and 334*d*, samples are taken by each sensor. For example, a number of transmitted light samples may be taken by each of the transmitted light sensors PS1 and PS2 and a number of reflected light samples may be taken by each of the reflected light sensors 334*b* and 334*d*. The processor 54 (see FIG. 23) can then calculate an average for each sensor or each type of sensor. For example if 20 samples for each bill are taken by each of the transmitted light sensors PS1 and PS2 and 64 samples are taken by each of the reflected light sensors 334*b* and 334*d*, then the raw average transmitted light value could be found as:

$$RawAverageTransmitted = \frac{\sum PS1 + \sum PS2}{40}$$

where RawAverageTransmitted is the transmitted light value for the bill, ΣPS1 is the summation of readings from the first transmitted light sensor PS1, and ΣPS2 is the summation of readings from the second transmitted light sensor PS2.

Likewise, if 64 samples for each bill are taken by each of the reflected light sensors 334*b* and 334*d*, the raw average reflected light value could be found as:

$$RawAverageR = \frac{\sum 334b + \sum 334d}{128}$$

where RawAverageR is the reflected light value for the bill being tested, Σ334*b* is the summation of readings from the reflected light sensor 334*b*, and Σ334*d* is the summation of readings from the reflected light sensor 334*d*.

In general, multiple sensors may be used for gathering both transmitted light data and reflected light data. Where several transmitted light sensors are used for gathering transmitted light data, the raw average transmitted light value may be calculated as:

$$RawAverageTransmitted = \frac{\sum TSensor_1 + \sum TSensor_2 + \cdots + \sum TSensor_n}{n \times (SamplesPerTSensor)}$$

where n is the total number of transmitted light sensors, SamplesPerTSensor is the total number of transmitted light readings taken by each transmitted light sensor, and ΣTSensor is the total transmitted light signal from a particular sensor.

Likewise, where several reflected light sensors are used for gathering reflected light data, the raw average reflected light value may be calculated as:

$$RawAverage\ R.eflected = \frac{\sum RSensor_1 + \sum RSensor_2 + \cdots + \sum RSensor_m}{m \times (SamplesPerRSensor)}$$

where m is the total number of reflected light sensors, SamplesPerRSensor is the total number of reflected light readings taken by each reflected light sensor, and ΣRSensor is the total reflected light signal from a particular sensor.

According to embodiments wherein one raw transmitted light value and one raw reflected light value is calculated for each passing document, an adjusted transmitted light value may be calculated for each bill. According to some embodiments, a reflectance ratio is calculated by dividing a master reflected light value by the reflected light value for the bill being tested. The reflected light value may be determined by the processor 54, after gathering reflected light readings from the reflected light sensors, in the form of reflected light signals. This reflectance ratio can be determined as:

$$\text{Reflectance Ratio} = \frac{R_{Master}}{RawAverageR}$$

where the Reflectance Ratio is the reflectance ratio for the bill currently being handled, $R_{Master}$ is the master reflected light value for the bill type, as above, and RawAverageR is the reflected light value of the bill currently being tested.

The reflectance ratio can be used as an indicator of the relative cleanliness or dirtiness of individual bills, and can also indicate whether a bill has been worn down through handling. For example, an especially clean bill or a bill whose ink has been worn off by handling will have a higher reflected light value. The reflectance ratio for such a bill will be less than one. A dirty bill, on the other hand, will have a lower reflected light value and will thus have a reflectance ratio greater than one.

Once the reflectance ratio has been calculated for a bill under test, an adjusted transmitted light value is calculated by multiplying the raw transmitted light value for the bill under test by the reflectance ratio. The adjusted transmitted light value is then compared to a master transmitted light value. According to some embodiments, the master transmitted light value can be specific to the document type. For example, a 50 peso note may transmit more light than a 100 peso note, and thus the master transmitted light value for the 50 peso note would be greater than for the 100 peso note.

According to other embodiments, the master transmitted light value may be the same across a number of document types. For example, all U.S. bills may have the same master transmitted light value regardless of denomination.

According to one embodiment, if the adjusted transmitted light value exceeds the master transmitted light value to which it is compared, the bill under test passes the doubles detection test, that is, the processor determines that only one bill has been transported past the doubles detection sensors. On the other hand, if the adjusted transmitted light value is less than or equal to the master transmitted light value to which it is compared, the bill under test fails the doubles detection test, that is, the processor determines that more than one bill at a time has been transported past the doubles detection sensors. Alternatively, if the adjusted transmitted light value is greater than or equal to the master transmitted light value to which it is compared, the processor may determine that only one bill has been transported past the doubles detection sensors. In this embodiment, if the adjusted transmitted light value is less than the master transmitted light value to which it is compared, the bill under test fails the doubles detection test.

According to one embodiment, the processor may be adapted to determine a range of acceptable adjusted transmitted light values beyond a straight comparison to the master transmitted light value. For example, the processor may be programmed to accept a threshold range of values up to a predetermined range below the master transmitted light value as evidence of a single bill. In this embodiment, the processor will determine that bills are doubled only when the transmitted light value of the bills under test fall below the predetermined range below the master transmitted light value.

The processor may generate a doubles error signal when doubled bills are detected. The processor may then control the operation of the currency handling device to appropriately handle a doubles detection error such as by halting the operation of the device or off-sorting double fed bills to a specific output receptacle such as a reject receptacle.

Figure 19:
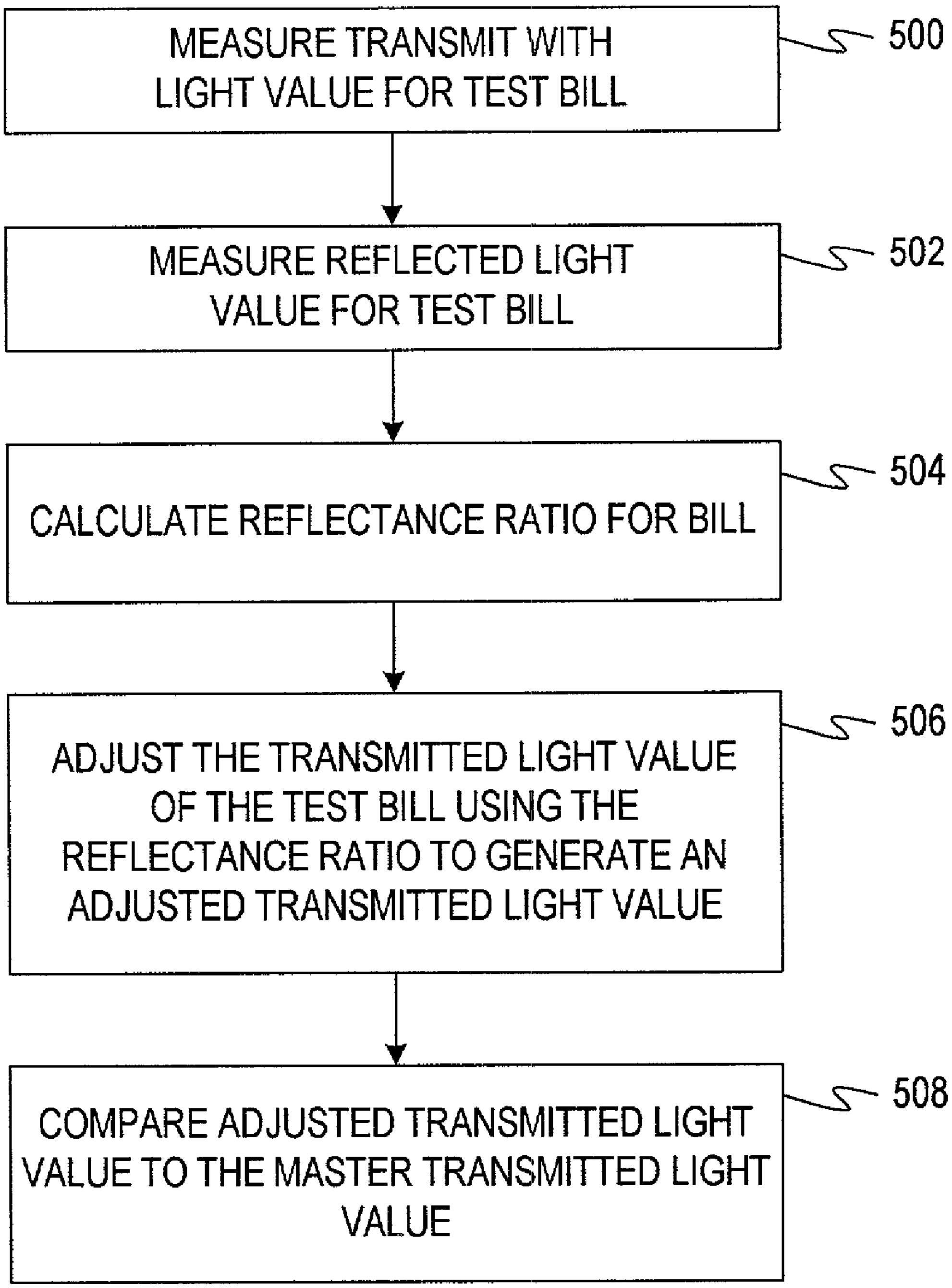
FIG. 19 is a flow diagram illustrating the operation of one embodiment of a processor combining reflected and transmitted light information.

FIG. 19 is a flow diagram illustrating the operation of a processor combining reflected light information with transmitted light information. First the transmitted light value and reflected light value of a bill are measured as shown in blocks 500 and 502. Next, the processor calculates a reflectance ratio for the bill as shown in block 504. Then, at block 506, the reflectance ratio is used to adjust the transmitted light value for the test bill to generate an adjusted transmitted light value for the test bill. The adjusted master transmitted light value is then compared to transmitted light value for the bill to determine whether more than one bill at a time is passing the doubles detection sensors, as shown in block 508.

Figure 20:
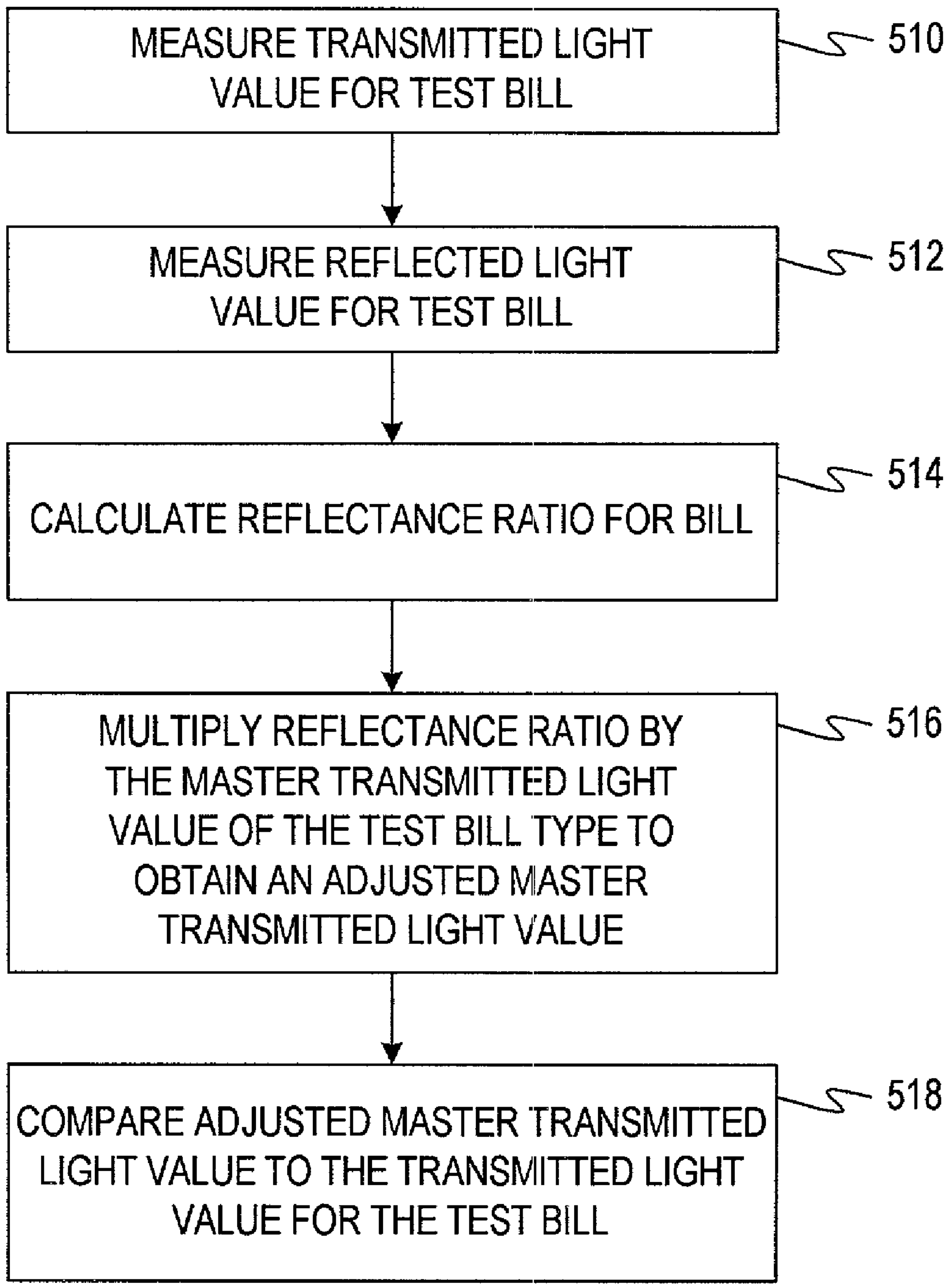
FIG. 20 is a flow diagram illustrating the operation of another embodiment of a processor combining reflected and transmitted light information.

In some embodiments, as shown in FIG. 20, the reflectance ratio can by used to adjust a master transmitted light value for a bill and the adjusted master transmitted light value for the bill can then be compared to the transmitted light value of the test bill. In these embodiments, the transmitted light value of the test bill is measured as shown at block 510, and a reflected light value for the test bill is measured as shown at block 512. Next, the reflectance ratio for the bill under test is calculated at block 514. As shown in block 516, the reflectance ratio is multiplied by the master transmitted light value for the type of bill under test to obtain an adjusted master transmitted light value. Then, as shown at block 518, the adjusted master transmitted light value is compared to the transmitted light value for the test bill to make a doubles determination.

In some embodiments, the reflectance ratio is calculated by dividing the master reflected light value by a reflected light value for a document under test. Alternatively, the reflectance ratio may be calculated by dividing a reflected light value for a document under test by the master reflected light value. According to some embodiments, the ratio is then multiplied by either the master transmitted light value or the transmitted light value for a document under test. According to other embodiments, the inverse of the ratio is then multiplied by either the master transmitted light value or the transmitted light value for a document under test.

Figure 24:
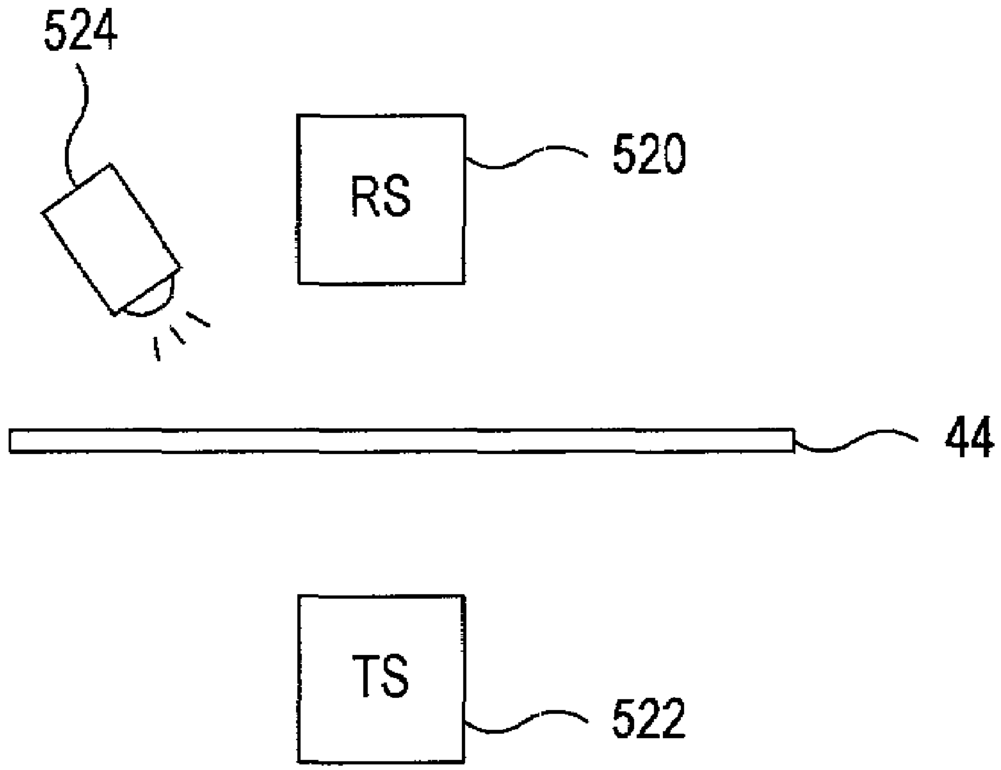
FIG. 24 is a functional block diagram of one embodiment of a doubles detection system using transmitted and reflected light.

As shown in FIG. 24, reflected light and transmitted light may be sensed under some embodiments of the present invention by one or more reflected light sensors 520 and one or more transmitted light sensors 522, positioned on opposite sides of a bill 44. The reflected light sensor 520 and the transmitted light sensor 522 may be photosensors as are known in the art, and may be adapted to generate analog or digital signals corresponding to the amount of light striking the sensors. The light is generated at a light source 524, such as a fluorescent bulb, an incandescent bulb, or any other light source known in the art.

Because clean or worn-down bills, which are generally less dense and which will have higher than average reflected light values, will have reflectance ratios less than one in the embodiment where the reflectance ratio is calculated by dividing a master reflected light value by the reflected light value for the test document, the procedure shown in FIG. 19 (first flow chart) will result in a lower adjusted transmitted light value for such bills. Thus, the doubles detection system is corrected to indicate a less dense bill, thus lessening the chances that two or more thin doubled bills will not be detected. The correction of the doubles detection system is especially effective in countries having white bills, because the reflected light value differences between clean and dirty bills are much greater than in countries having colored bills.

For example, in an embodiment where the reflectance ratio for a bill is calculated by dividing a master reflected light value by the reflected light value for the test document, the testing of a lighter, cleaner, or worn-down document may proceed as follows. A lighter document will be expected to reflect more light than a standard document. The expected value for a standard document is represented by the master reflected light value for the document type. For the present example, let us assume that the master reflected light value for the document type is 1.0 and the reflected light value for the test bill is 1.15. The reflectance ratio for such a bill may be calculated as:

$$\text{Reflectance Ratio} = \frac{R_{Master}}{RawAverageR} = \frac{1.0}{1.15} \approx 0.87.$$

This reflectance ratio may next be inverted and multiplied by the master transmitted light value for the test bill to arrive at an adjusted master transmitted light value. In this example, the lighter or worn-down bill should be expected to pass more light through than an average or standard bill. Thus, if the reflectance ratio is to be multiplied by the master transmitted light value for the bill type, corresponding to the expected transmitted light value for the test bill, the reflectance ratio must first be inverted so that the expected transmitted light value for the test bill is adjusted upwardly.

For the present example, let us assume that the master transmitted light value for the test bill is 0.5. The adjusted master transmitted light value may be calculated as:

$$\text{Adjusted Master Transmitted light value}(0.87)^{-1}\times 0.5=1.15\times 0.5\approx 0.58.$$

In the present example, the adjusted master transmitted light value is increased over the master transmitted light value because the reflected light measurement indicates that the test bill should be expected to pass through more light than an average or standard bill. In one embodiment, the bill may be treated as a doubled bill if its transmitted light value is found to be below the adjusted master transmitted light value. Alternatively, the processor 54 may be programmed to add a threshold range to the adjusted master transmitted light value, so that only bills transmitting light below the threshold range are treated as doubled bills.

Dirty or inky bills, which are generally denser than average or standard bills will have reflectance ratios which indicate the reflectance of less light than an average or standard bill. The expected transmitted light value for a dirty bill will therefore be lowered, and this lessens the chance that a single dirty bill will be incorrectly indicated to be two or more doubled bills. Alternatively, when a dirty test bill is encountered, its reflectance ratio may be used to elevate the transmitted light value for the test bill, so that during the comparison with a master transmitted light value, its adjusted transmitted light value will be higher than its actual transmitted light value.

Alternative embodiments may involve squaring or otherwise mathematically manipulating the reflectance ratio to give the optimum accuracy for the doubles detection system. For example, the processor 54 (see FIG. 23) may square the reflectance ratio and multiply the result by the test bill's transmitted light value to arrive at an adjusted transmitted light value.

Further, though the reflected light measurement system has been specified with respect to a color scanhead, it may also be fabricated using a monochrome scanhead (e.g., simple photosensitive cells). The doubles detection system of the present invention may be used in currency handling devices such as are disclosed in U.S. Pat. No. 5,295,195 and U.S. Pat. No. 5,815,592 and published PCT application number WO 93/23824 which are incorporated herein by reference in their entirety. Further, the present invention could be used in note counters.

Normalization

In one embodiment, the currency handling system 10 monitors the intensity of light provided by the light sources. It has been found that the light source and/or sensors of a particular system may degrade over time. Additionally, the light source and/or sensor of any particular system may be affected by dust, temperature, imperfections, scratches, or anything that may affect the brightness of the tubes or the sensitivity of the sensor. Similarly, systems utilizing magnetic sensors will also generally degrade over time and/or be affected by its physical environment including dust, temperature, etc. To compensate for these changes, each currency handling system 10 will typically have a measurement "bias" unique to that system caused by the state of degradation of the light sources or sensors associated with each individual system.

The present invention is designed to achieve a substantially consistent evaluation of bills between systems by "normalizing" the master information and test data to account for differences in sensors between systems. For example, where the master information and the test data comprise numerical values, this is accomplished by dividing both the threshold data and the test data obtained from each system by a reference value corresponding to the measurement of a common reference by each respective system. The common reference may comprise, for example, an object such as a mirror or piece of paper or plastic that is present in each system. The reference value is obtained in each respective system by scanning the common reference with respect to a selected attribute such as size, color content, brightness, intensity pattern, etc. The master information and/or test data obtained from each individual system is then divided by the appropriate reference value to define normalized master information and/or test data corresponding to each system. The evaluation of bills in the standard mode may thereafter be accomplished by comparing the normalized test data to normalized master information.

Attributes Sensed

The characteristic information obtained from the scanned bill may comprise a collection of data values each of which is associated with a particular attribute of the bill. Various attributes of a bill which may be sensed are described in greater detail in PCT application WO 99/48042.

IV. Standard Mode/Learn Mode

According to some embodiments, the currency handling system 10 of FIG. 1 may be operated in either a "standard" currency evaluation mode or a "learn" mode. In the standard currency evaluation mode, the data obtained by the scanheads or sensors 70, is compared by the processor 54 to prestored master information in the memory 56. The prestored master information corresponds to data generated from genuine "master" currency of a plurality of denominations and/or types. Typically, the prestored data represents an expected numerical value or range of numerical values or a pattern associated with the characteristic information scan of genuine currency. The prestored data may further represent various orientations and/or facing positions of genuine currency to account for the possibility of a bill in the stack being in a reversed orientation or reversed facing position compared to other bills in the stack.

The specific denominations and types of currency from which master information may be expected to be obtained for any particular system 10 will generally depend on the market in which the system 10 is used (or intended to be used). In European market countries, for example, with the advent of Euro currency (EC currency), it may be expected that both EC currency and a national currency will circulate in any given country. In Germany, for a more specific example, it may be expected that both EC currency and German deutsche marks (DMs) will circulate. With the learn mode capability of the present invention, a German operator may obtain master information associated with both EC and DM currency and store the information in the memory 56.

Of course, the "family" of desirable currencies for any particular system 10 or market may include more than two types of currencies. For example, a centralized commercial bank in the European community may handle several types of currencies including EC currency, German DMs, British Pounds, French Francs, U.S. Dollars, Japanese Yen and Swiss Francs. In like manner, the desirable "family" of currencies in Tokyo, Hong Kong or other parts of Asia may include Japanese Yen, Chinese Remimbi, U.S. Dollars, German DMs, British Pounds and Hong Kong Dollars. As a further example, a desirable family of currencies in the United States may include the combination of U.S. Dollars, British Pounds, German DMs, Canadian Dollars and Japanese Yen. With the learn mode capability of the present invention, master information may be obtained from any denomination of currency in any desired "family" by simply repeating the learn mode for each denomination and type of currency in the family.

This may be achieved in successive operations of the learn mode by running currency bills of the designated family, one currency denomination and type at a time, through the scanning system 10 to obtain the necessary master information. The number of bills fed through the system may be as few as one bill, or may be several bills. The bill(s) fed through the system may include good quality bill(s), poor quality bills or both. The master information obtained from the bills defines ranges of acceptability for patterns of bills of the designated denomination and type which are later to be evaluated in "standard" mode.

For example, suppose a single good quality bill of a designated denomination and type is fed through the system 10 in the learn mode. The master information obtained from the bill may be processed to define a range of acceptability for bills of the designated denomination and type. For instance, the master information obtained from the learn mode bill may define a "center" value of the range, with "deltas," plus or minus the center value, being determined by the system 10 to define the upper and lower bounds of the range. Alternatively, a range of acceptability may be obtained by feeding a group of bills through the system 10 one at a time, each bill in the group being of generally "good" quality, but differing in degree of quality from others in the group. In this example, the average value of the notes in the group may define a "center value" of a range, with values plus or minus the center value defining the upper and lower bounds of the range, as described above.

Alternatively, master information obtained from the poorest quality of the learn mode or master bills may be used to define the limits of acceptability for bills of the designated denomination and type, such that bills of the designated denomination and type evaluated in the standard mode will be accepted if they are at least as "good" in quality as the poorest quality of the learn mode or master bills. Still another alternative is to feed one or more poor quality bills through the system 10 to define "unacceptable" bill(s) of the denomination and type, such that bills of the designated denomination and type evaluated in standard mode will not be accepted unless they are better in quality than the poor quality learn mode bills.

Because the currency bills are initially unrecognizable to the currency handling system 10 in the learn mode, the operator must inform the system 10 (by means of operator interface panel 32 or external signal, for example) which denomination and type of currency it is "learning," so that the system 10 may correlate the master information it obtains (and stores in memory) with the appropriate denomination, type and "acceptability" of the bill(s).

For purposes of illustration, suppose that an operator desires to obtain master information for $5 and $10 denominations of U.S. and Canadian Dollars. In one embodiment, this may be achieved by instructing the system 10, by means of an operator interface panel 32 or external signal, to enter the learn mode and that it will be reading a first denomination and type of currency (e.g., $5 denominations of U.S. currency). In one embodiment, the operator may further instruct the system 10 which type of learn mode sensor(s) it should use to obtain the master information and/or what type of characteristic information it should obtain to use as master information. The operator may then insert a single good-quality $5 dollar U.S. bill (or a number of such bills) in the hopper 36 and feed the bill(s) through the system to obtain master information from the bill(s) from a designated combination of learn mode sensors.

In an alternate embodiment, where a single bill is fed through the system 10, suppose that an arbitrary value "x" is obtained from the learn mode sensors. The system 10 may define the value "x" to be a center value of an "acceptable" range for $5 dollar U.S. bills. The system 10 may further define the values "1.2x" and "0.8x" to comprise the upper and lower bounds of the "acceptable" range for $5 dollar U.S. bills. Alternatively, where multiple $5 dollar U.S. bills, each bill being of generally "good" quality, are fed through the system 10, (and again using the arbitrary sensor value "x" for purposes of illustration), suppose that the average sensor value obtained from the bills is "1.1x". The system 10 in this case may define the "acceptable" range for $5 dollar U.S. bills to be centered at the average sensor value "1.1x," with the values "1.3x" and "0.9x" defining the respective upper and lower bounds of the range. Alternatively, where multiple $5 dollar U.S. bills are fed through the system 10, suppose that sensor values obtained in the learn mode range between "1.4x" and "0.9x". The system 10 may define the values "1.4x" and "0.9x" to be the upper and lower bounds of the "acceptable range" for $5 dollar U.S. bills, without regard to the average value. As still another example, suppose that the operator feeds two poor quality U.S. $5 dollar bills through the system 10, and suppose that sensor readings of "1.5x" and "0.7x" are obtained from the poor quality bills. The system 10 may then determine the range of acceptability for U.S. $5 dollar bills to be between the values of "0.7x" and "1.5x."

Next, after master information has been obtained from U.S. $5 dollar bills, the operator feeds the next bill(s) through the system 10, and the system scans the bills to obtain master information from the bills, in any of the manners heretofore described. In one embodiment, the operator may instruct the system 10 which type of learn mode sensor(s) it should use to obtain the master information. Alternatively, the operator may instruct the system 10 which type of master information is desired, and the system 10 automatically chooses the appropriate learn mode sensor (s). For example, an operator may wish to use optical and magnetic sensors for U.S. currency and optical sensors for Canadian currency.

After the operator has obtained master information from each desired currency denomination and type, the operator instructs the system 10 to enter the "standard" mode, or to depart the "learn" mode. The operator may nevertheless re-enter the learn mode at a subsequent time to obtain master information from other currency denominations, types and/or series.

It will be appreciated that the sensors used to obtain master information in the learn mode may be either separate from or the same as the sensors used to obtain data in the standard mode.

Not only can the currency handling system 10 in the learn mode add master information of new currency denominations, but the system 10 may also replace existing currency denominations. If a country replaces an existing currency denomination with a new bill type for that denomination, the currency handling system 10 may learn the new bill's characteristic information and replace the previous master information with new master information. For example, the operator may use the operator interface 32 to enter the specific currency denomination to be replaced. Then, the master currency bills of the new bill type may be conveyed through the currency handling system 10 and scanned to obtain master information associated with the new bill's characteristic information, which may then be stored in the memory 56. Additionally, the operator may delete an existing currency denomination stored in the memory 56 through the operator interface 32. In one embodiment, the operator must enter a security code to access the learn mode. The security code ensures that qualified operators may add, replace or delete master information in the learn mode.

Figure 25:
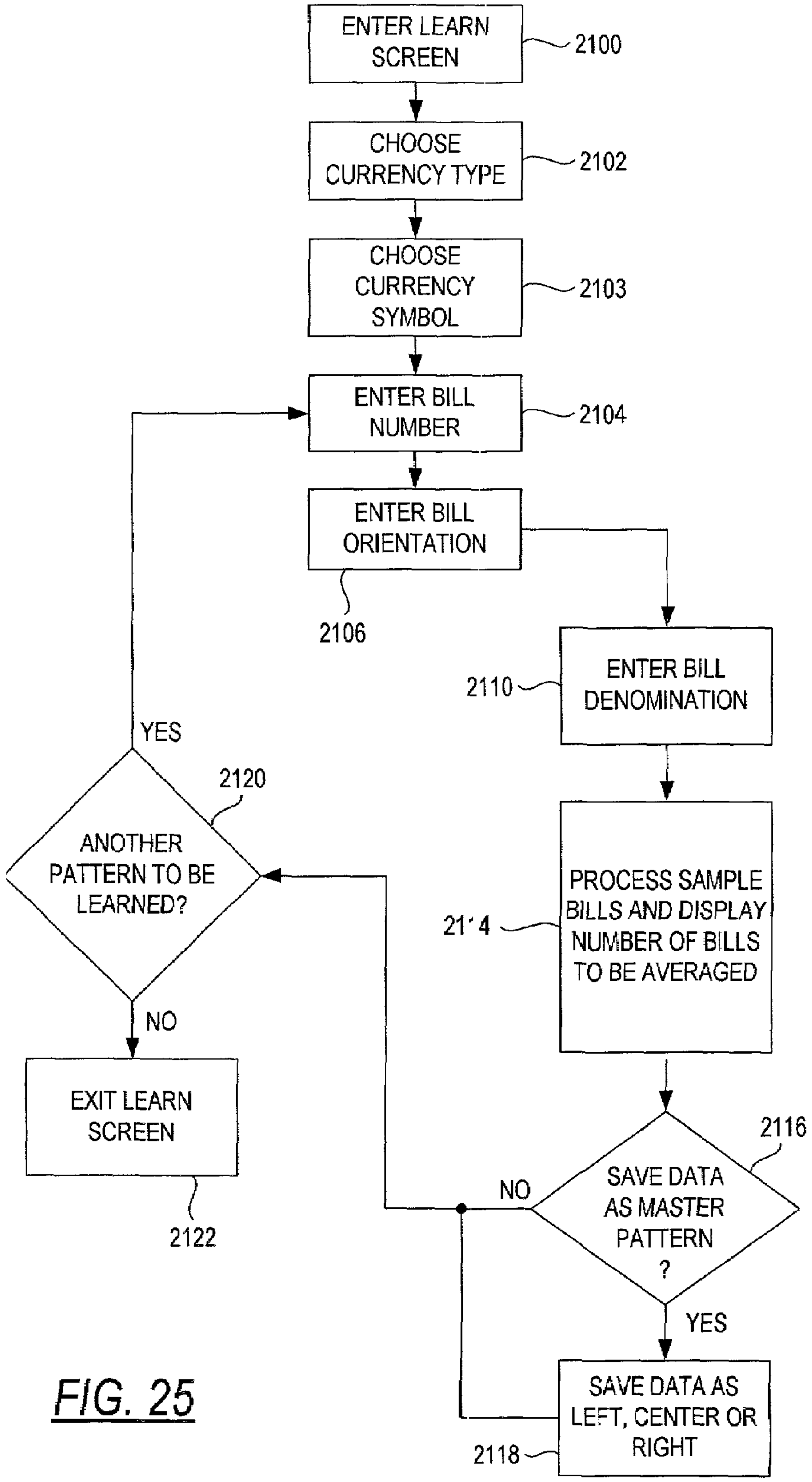
FIG. 25 is a flow chart of one embodiment of the learn mode.

One embodiment of how the learn mode functions is set forth in the flow chart illustrated in FIG. 25. First the operator enters the learn screen at step 2100 by pressing a key, such as a "MODE" key, on the operator interface panel 32. Next the operator chooses the currency type of the bills to be processed in the learn mode at step 2102 by scrolling through the list of currency types that are displayed on the screen when the learn mode is entered at step 2100. The operator chooses the desired currency type by aligning the cursor with the desired currency type displayed on the screen and pressing a key such as the "MODE" key. The operator then chooses the currency symbol associated with the currency type to be processed at step 2103 by scrolling through the list of currency symbols displayed on the screen after the currency type has been chosen. The operator chooses the desired currency symbol by again aligning the cursor with the desired symbol displayed on the screen and pressing the "MODE" key.

This advances the program to step 2104 where the operator enters the bill number, which is used to identify the different denomination or series of a bill for any given currency type. For example, different types of currency have denominations that have more than one series, e.g., there are two series of U.S. $100 bills, one with the old design and one with the new design. In this embodiment of the system 10, up to nine bill denominations and/or series can be learned. Here again, the display contains a menu of the available bill numbers (1–9), and the operator selects the desired bill number by aligning the cursor with the desired bill number and pressing the "MODE" key. Next, at step 2106, the operator enters the orientation of the bill, i.e., face up bottom edge forward, face up top edge forward, face down bottom edge forward or face down top edge forward.

From the above selections, the system 10 determines what master information to learn from the bill(s) to be processed in the learn mode. Then, the operator in step 2110 enters the bill denomination either by scrolling through a displayed menu of the denominations corresponding to the currency type entered in step 2102, or in an alternate embodiment, by pressing one of the denomination keys to identify the particular denomination to be learned. The system 10 automatically changes the denomination associated with the denomination keys to correspond to the denominations available for the currency type entered in step 2102. When the operator enters the denomination, the system 10 advances to step 2114 where the system processes the sample bills and displays the number of sample bills to be averaged. This step is described in further detail in connection with FIG. 26. For example, it may be desirable to average several different bills of the same denomination, but in different conditions, e.g., different degrees of wear, so that the patterns of a variety of bills of the same denomination, but of different conditions, can be averaged. Up to nine bills can be averaged to create a master pattern in this embodiment of the system 10. Typically, however, only one bill needs to be processed to generate master pattern data sufficient to authenticate a particular currency type and denomination in standard mode. This pattern averaging procedure is described in more detail in U.S. Pat. No. 5,633,949.

At step 2114, the system prompts the operator via the screen display to load the sample bill into the input hopper and then press a key, such as a "START" key. The bill is processed by the system 10 by being fed into the transport mechanism of the system 10. As the bill is fed through the system 10, the system scans the bill and adds the new information to the master pattern data corresponding to the scanned bill. Eventually, the master pattern data will be averaged.

The operator is prompted at step 2116 to save the data corresponding to the characteristics learned. The operator saves the data corresponding to the characteristics learned as a master pattern by selecting "YES" from the display menu by aligning the cursor at "YES" and pressing a key such as the "MODE" key. Similarly, to continue without storing the data, the operator selects "NO" from the display menu by aligning the cursor over "NO" and pressing the "MODE" key. An operator may decide not to save the data if, while learning one denomination, the operator decides to learn another currency denomination and/or type. If the operator saves the data, the operator will next decide whether to save the data as left, center or right master data. These positions refer to where in relation to the edges of the input hopper 36 the bill was located when it entered the transport mechanism 38. The system 10 has an adjustable hopper 36 so if bills of one denomination are being processed, all the bills are fed down the center of the transport mechanism. However, if mixed denominations are being processed in the standard mode from a currency type that had different size denominations, then the hopper would have to be adjusted to accommodate the maximum size bill in the stack. Thus, a narrower dimension bill could shift in the hopper such that the data scanned from the bill would vary according to where in the hopper the bill entered the transport mechanism. Accordingly, in learn mode, master data scanned from a bill varies according to where in the input hopper the bill enters the transport mechanism. Therefore, the lateral position of the bill may either be communicated to the system 10 so the learned data can be stored in an appropriate memory location corresponding to the lateral position of the bill, or the system 10 can automatically determine the lateral position of the bill by use of the "X" sensors 1502*a,b*.

In step 2120, the operator is prompted regarding whether or not another pattern or set of reflected light or transmitted light is to be learned. The learn mode may be used to allow the system 10 to develop master transmitted light values and/or master reflected light values. These values may be stored in combination with pattern information for particular bill types and denominations, enabling. In one embodiment, the reflected light sensors 334*b* and 334*d* and the transmitted light sensors 95 and 97 shown in FIG. 23 are used to generate reflected light signals and transmitted light signals which are received by the processor 54 and used to determine master transmitted light values and/or master reflected light values. If the operator decides to have the system 10 learn another pattern or transmitted and/or reflected light data, the operator selects "YES" from the display menu by aligning the cursor at "YES". If another pattern is to be learned, steps 2104–2120 are repeated. If the operator chooses not to learn another characteristic by selecting "NO", then the system 10 in step 2122 will exit the learn screen. Thereafter, the operator may learn another set of currency denominations from another country by re-entering the learn screen at step 2100.

Figure 26:
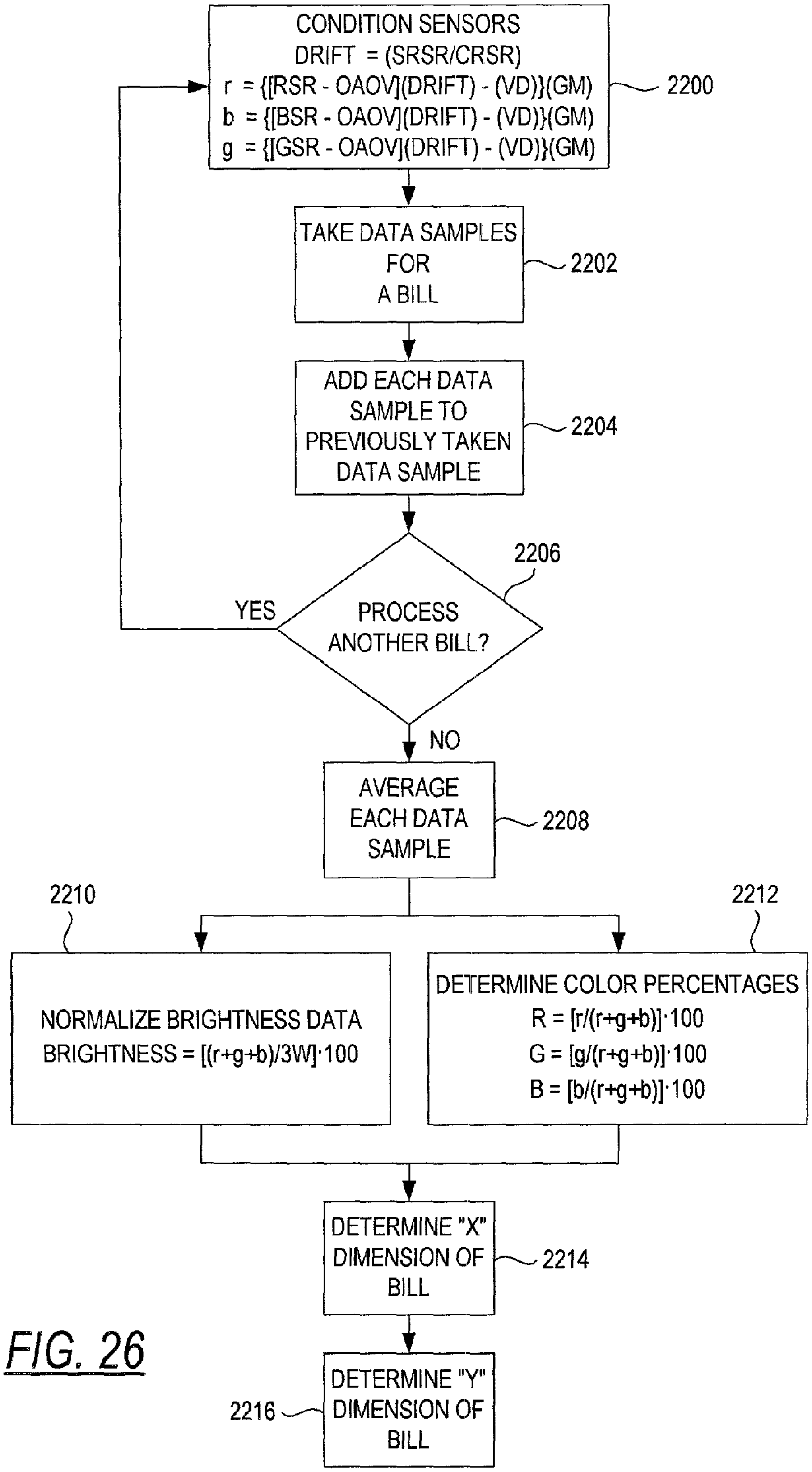
FIG. 26 is a flow chart further defining a step of the flow chart of FIG. 25.

The details of how the system 10 processes the sample bills in step 2114 is illustrated in the flow chart of FIG. 26. For each data sample for each pattern to be learned, the system 10 in step 2200 conditions the sensors. Four equations are used in adjusting the sensors. The first equation is the drift light intensity equation:

$$DRIFT=(SRSR/CRSR)$$

Figure 18:
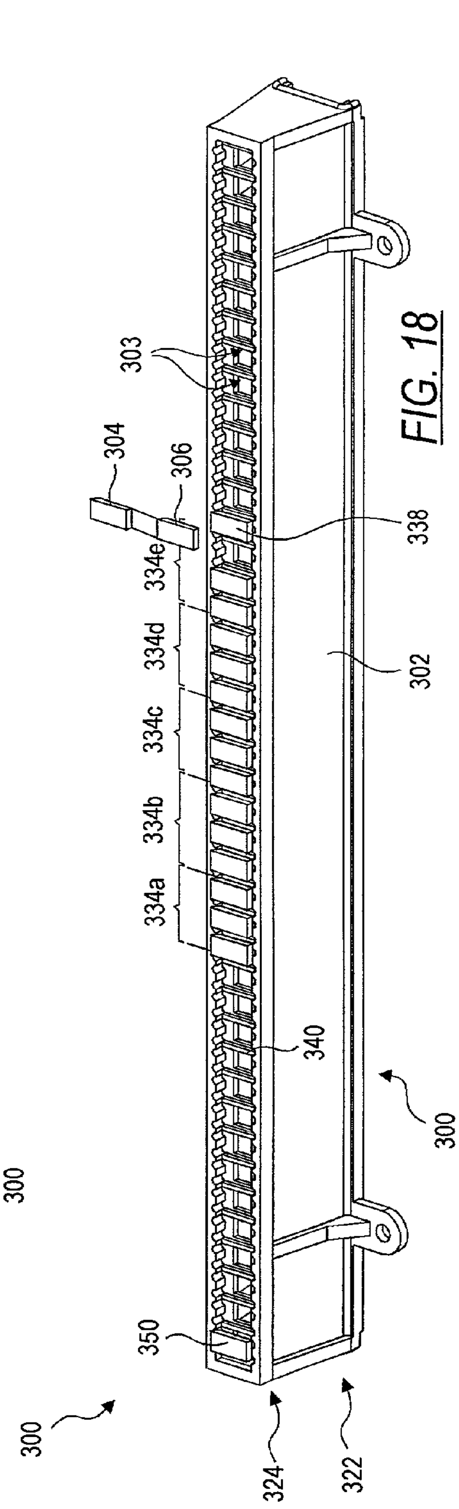
FIG. 18 is a bottom perspective view of the color scanhead of FIG. 17.

The light intensity drift (drift) is calculated by dividing a stored reference sensor reading SRSR by the current reference sensor reading. The stored reference sensor reading corresponds to the signal produced by the light intensity reference sensor at calibration time. The reference sensor 350 is illustrated in FIG. 18. The adjusted red (r) or red hue, the adjusted blue (b) or blue hue and the adjusted green (g) or green hue are calculated from the following formulas:

$$r=\{[RSR-OAOV](DRIFT)-(VD)\}(GM)$$

$$b=\{[BSR-OAOV](DRIFT)-(VD)\}(GM)$$

$$g=\{[GSR-OAOV](DRIFT)-(VD)\}(GM)$$

The sensor readings RSR, BSR and GSR are measured in millivolts (mv). OAOV is the op-amp offset voltage which is an empirically derived error voltage obtained by reading the sensors with the fluorescent light tubes turned off and is typically between 50 mv and 1,000 mv. Drift indicates the change in light intensity. VD (dark voltage) which represents internal light reflections is obtained by reading the sensors with the fluorescent light tubes on when a non-reflective black calibration standard material is placed in front of the sensors. The gain multiplier (GM) is an empirically derived constant obtained at calibration time from the following equation:

$$GM=W/(WSR-OAOV)$$

where WSR is a variable corresponding to the white sensor reading, i.e., the voltage measured when a white calibration standard is present in front of the sensors, OAOV is the op-amp offset voltage, and W is a constant corresponding to the voltage that the sensors should give when a white calibration standard is present in front of the sensors (generally, W=2.5 v). In step 2202, the system 10 takes data samples for the bill currently being scanned. For example, 64 data samples can be taken at various points along a bill.

In step 2204, each data sample is added to the previously taken corresponding data sample (or to zero if this is the first bill processed). For example, if 64 data samples are taken, each of the 64 data samples is added to the respective data sample(s) previously taken and stored in memory.

In step 2206, the operator is prompted regarding whether or not to process another bill to create the master pattern data. If the operator decides to process another bill, the operator selects "YES" from the display menu by aligning the cursor at "YES" and pressing the "MODE" key. If another bill of the same currency type and denomination is to be processed (for pattern averaging purposes), steps 2200–2206 are repeated. If the operator chooses not to process another bill by selecting "NO", then the system 10 proceeds to step 2208 where the averages of the summed data samples are computed. The average is computed by taking each sum from step 2204 and dividing by the number of bills processed. For example, if 64 data samples were taken from three bills, the sum of each of the 64 data samples is divided by three. Next, the system 10 determines the color percentages in step 2212. Three equations are used to determine the color percentages, namely:

$$R=[r/(r+g+b)]\cdot 100$$

$$G=[g/(r+g+b)]\cdot 100$$

$$B=[b/(r+g+b)]\cdot 100$$

The first equation determines the percentage of red reflected from the bill. This is calculated by dividing the adjusted red value r by the sum of the adjusted red, green and blue values r, g and b from step 2200 and multiplying that result by 100. The percentage of green and blue is found in a similar manner from the second and third equations, respectively.

Simultaneously, the system 10 normalizes the brightness data in step 2210. The brightness data corresponds to the intensity of the light reflected from the bill. The equation used to normalize the brightness data is:

$$BRIGHTNESS=[(r+g+b)/3W]\cdot 100$$

In that equation, W is the same as defined above. Then, the system 10 in step 2214 determines the "X" (or long) dimension of the bill. The system 10 then determines in step 2216 the "Y" (or narrow) dimension of the bill. The details of how the bill size is determined were detailed above in section B. Size.

Information on other techniques which may be used with the present invention, such as brightness correlation techniques and color correlation techniques may be found in PCT application WO 99/48042.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A doubles detection system for detecting doubled documents, the system comprising:

at least one light source disposed on a first side of a test document;

at least one reflected light sensor disposed along the first side of the test document, and adapted to generate at least one reflected light signal;

at least one transmitted light sensor disposed along a second side of the test document, and adapted to generate at least one transmitted light signal;

a memory storing at least one master reflected light value and at least one master transmitted light value; and a processor adapted to (1) receive the reflected light signal, (2) generate a reflected light value for the test document, (3) calculate a reflectance ratio between the reflected light value of the test document and the master reflected light value, (4) receive the transmitted light signal, (5) generate a transmitted light value for the test document, (6) adjust the master transmitted light value based on the reflectance ratio, (7) compare the adjusted master transmitted light value to the transmitted light value for the test document, and (8) generate a doubles signal if the comparison of the adjusted master transmitted light value with the transmitted light value for the test document indicates that more than one document is present.

2. The doubles detection system of claim 1 wherein the adjusted master transmitted light value determines a threshold for acceptable transmitted light values.

3. The doubles detection system of claim 2 wherein a test document having a transmitted light value lower than the threshold is determined to be a doubled document.

4. The doubles detection of claim 3 wherein the doubled document is off-sorted into an output receptacle.

5. The doubles detection system of claim 1 wherein the master reflected light value and the master transmitted light value are input manually.

6. The doubles detection system of claim 1 wherein the master reflected light value and the master transmitted light value are determined in a learning mode.

7. The doubles detection system of claim 1 wherein the master reflected light value and the master transmitted light value are determined, respectively, by averaging a plurality of individual reflected light values and individual transmitted light values for a series of master documents.

8. The doubles detection system of claim 1 wherein the master reflected light value and the master transmitted light value are determined, respectively, by averaging a plurality of individual reflected light values and individual transmitted light values for a series of test documents.

9. The doubles detection system of claim 1 wherein calculating the reflectance ratio comprises dividing the master reflected light value by the reflected light value of the test document.

10. The doubles detection system of claim 9 wherein adjusting the master transmitted light value comprises multiplying the master transmitted light value by the reflectance ratio.

11. The doubles detection system of claim 1 wherein calculating the reflectance ratio comprises dividing the reflected light value of the test document by the master reflected light value.

12. The doubles detection system of claim 11 wherein adjusting the master transmitted light value comprises multiplying the master transmitted light value by an inverse of the reflectance ratio.

13. A method for detecting doubled documents comprising:

illuminating a first side of a test document;

detecting at least one reflected light value from the first side of the test document;

detecting at least one transmitted light value from a second side of the test document;

calculating a reflectance ratio between a master reflected light value and the reflected light value for the test document;

adjusting a master transmitted light value based on the reflectance ratio;

comparing the adjusted master transmitted light value to the transmitted light value for the test document; and generating a doubles signal if the comparison of the adjusted master transmitted light value with the transmitted light value for the test document indicates that more than one document is present.

14. The method of claim 13 further comprising off-sorting doubled documents in response to the doubles signal.

15. The method of claim 13 wherein calculating a reflectance ratio comprises dividing the master reflected light value by the reflected light value of the test document.

16. The method of claim 15 wherein adjusting the master transmitted light value based an the reflectance ratio comprises multiplying the master transmitted light value by the reflectance ratio.

17. The method of claim 15 wherein adjusting the master transmitted light value based on the reflectance ratio comprises multiplying the master transmitted light value by the square of the reflectance ratio.

18. The method of claim 13 wherein calculating a reflectance ratio comprises dividing the reflected light value of the test document by the master reflected light value.

19. The method of claim 18 wherein adjusting the master transmitted light value based on the reflectance ratio comprises multiplying the master transmitted light value by an inverse of the reflectance ratio.

20. The method of claim 18 wherein adjusting the master transmitted light value based on the reflectance ratio comprises multiplying the master transmitted light value by the square of an inverse of the reflected light value.

21. A currency handling device comprising:

a currency path adapted to transport a test document;

at least one light source disposed on a first side of the currency path;

at least one reflected light sensor disposed on the first side of the currency path and adapted to generate a reflected light signal for the test document;

at least one transmitted light sensor disposed on a second side of the currency path and adapted to generate a transmitted light signal for the test document;

a memory storing at least one master reflected light value and at least one master transmitted light value; and a processor electrically connected to:

(a) the at least one reflected light sensor, (b) the at least one transmitted light sensor, and (c) the memory, the processor being adapted to access at least one master transmitted light value, calculate a reflectance ratio between a master reflected light value and a reflected light value derived from the reflected light signal for the test document, and adjust at least one master transmitted light value based on the reflectance ratio.

22. The currency handling device of claim 21 wherein the memory stores a plurality of master reflected light values and a plurality of master transmitted light values, each pair of master reflected light values and master transmitted light values corresponding to a type and denomination of currency.

23. The currency handling device of claim 21 wherein the at least one reflected light sensor is a scanhead cell.

24. A doubles detection system for detecting doubled documents, the system comprising:

at least one light source disposed on a first side of a test document, at least one reflected light sensor disposed along the first side of the test document, and adapted to generate at least one reflected light signal;

one or more transmitted light sensors disposed along a second side of the test document and adapted to generate at least one transmitted light signal;

a memory storing at least one master reflected light value and at least one master transmitted light value; and a processor adapted to (1) receive the reflected light signal, (2) generate a reflected light value for the test document, (3) calculate a reflectance ratio between the reflected light value of the test document and the master reflected light value, (4) receive the transmitted light signal, (5) generate a transmitted light value far the test document, (6) adjust the transmitted light value for the test document based on the reflectance ratio, (7) compare the adjusted transmitted light value for the test document to the master transmitted light value, and (8) generate a doubles signal if the comparison of the adjusted transmitted light value for the test document with the master transmitted light value indicates that more than one document is present.

25. A method for detecting doubled documents comprising:

illuminating a first side of a test document;

detecting at least one reflected light value from the first side of the test document;

detecting at least one transmitted light value from a second side of the test document;

calculating a reflectance ratio between a master reflected light value and the reflected light value for the test document;

adjusting the transmitted light value for the test document based on the reflectance ratio;

comparing the adjusted transmitted light value for the test document to a master transmitted light value; and generating a doubles signal if the comparison of the adjusted master transmitted light value with the transmitted light value for the test document indicates that more than one document is present.

26. A document handling device comprising:

illuminating means for illuminating a test document from a first side of the test document;

reflected light sensing means for sensing light reflected from the first side of the test document and further for generating a reflected light signal;

transmitted light sensing means for sensing light transmitted through the test document to a second side of the test document and further for generating a transmitted light signal;

memory means far storing a master reflected light value and a master transmitted light value; and a processor adapted to:

access the master transmitted light value, receive the reflected light signal, calculate a reflectance ratio based on the reflected light signal and the master reflected light value; and adjust the master transmitted light value based on the reflectance ratio.

27. A method for analyzing documents in a document handling device comprising:

sensing reflected light from a first side of a test document;

calculating a reflectance ratio based on a master reflected tight value and the reflected light from the test document; and adjusting a master transmitted light value based on the reflectance ratio.

28. A document handling device comprising:

an input receptacle adapted to receive a stack of test documents;

a document transport mechanism adapted to transport the test documents;

a light source disposed along a first side of the document transport mechanism and adapted to direct light toward the document transport mechanism and further adapted to illuminate the test documents from a first side of the test documents;

a reflected light sensor disposed along the first side of the document transport mechanism and adapted to generate an analog reflected light signal corresponding to the amount of light reflected from the first side of a test document;

a transmitted light sensor disposed along a second side of the document transport mechanism and adapted to generate an analog transmitted light signal corresponding to the amount of light transmitted through the test document to a second side of the test;

at least one amplifier electrically coupled to the reflected light sensor and the transmitted light sensor and adapted to amplify the analog light reflected light signal and the analog transmitted light signal;

an analog-to-digital converter electrically coupled to the amplifier and adapted to convert the amplified analog reflected light signal into a digital reflected light signal and further adapted to convert the amplified analog transmitted light signal into a digital transmitted light signal;

a memory adapted to contain a master reflected light value and a master transmitted light value associated with the type of the test document;

a processor electrically coupled to the analog-to-digital converter and to the memory and adapted to:

(1) receive the digital reflected tight signal, (2) generate at least one reflected light value for the test document (3) access the memory to retrieve the master reflected light value and the master transmitted light value associated with the type of the test document;

(4) calculate a reflectance ratio based on the reflected light value for the test document and the master reflected light value associated with the type of the test document;

(5) receive the digital transmitted light signal;

(6) generate at least one transmitted light value for the test document;

(7) adjust the master transmitted light value based on the reflectance ratio, (8) compare the adjusted master transmitted light value to the transmitted light value for the test document, and (9) generate a doubles signal if the comparison of the adjusted master transmitted light value with the transmitted light value for the test document indicates that more than one document is present; and an operator interface electrically coupled to the processor and adapted to receive the doubles signal and indicate the receipt of a doubles signal.

29. The device of claim 28 wherein accessing the memory to retrieve the master reflected light value and the master transmitted light value associated with the type of the test document comprises allowing a user to specie the type of the test document.

30. The device of claim 28 wherein the processor is further adapted to automatically determine the type of the test document.

31. The device of claim 30 wherein the processor is adapted to determine the type of the test document by comparing a pattern for the test document to stored patterns for a variety of types of documents.

32. A currency handling device comprising:

a currency path adapted to transport test currency from a stack of test currency at a rate of at least about 800 bills per minute;

at least one light source disposed on a first side of the currency path;

at least one reflected light sensor disposed on the first side of the currency path and adapted to generate a reflected light signal for the test currency;

at least one transmitted light sensor disposed on a second side of the currency path and adapted to generate a transmitted light signal for the test currency;

a memory storing at least one master reflected light value and at least one master transmitted light value; and a processor electrically connected to:

(a) the at least one reflected light sensor, (b) the at least one transmitted light sensor, and (c) the memory, the processor being adapted to access at least one master transmitted light value, calculate a reflectance ratio between a master reflected light value and a reflected light value derived from the reflected light signal for the test currency, and adjust at least one master transmitted light value based on the reflectance ratio.

33. The currency handling device of claim 32 wherein the currency path is adapted to transport test currency from a stack of test currency at a rate of at least about 1200 documents per minute.

34. A document handling device comprising:

a document path adapted to transport test documents from a stack of test documents at a rate of at least about 800 documents per minute;

at least one light source disposed on a first side of the document path;

at least one reflected light sensor disposed on the first side of the document path and adapted to generate a reflected light signal for the test documents;

at least one transmitted light sensor disposed on a second side of the document path and adapted to generate a transmitted light signal for the test documents;

a memory storing at least one master reflected light value and at least one master transmitted light value; and a processor electrically coupled to:

(a) the at least one reflected light sensor, (b) the at least one transmitted light sensor, and (c) the memory, the processor being adapted to access at least one master transmitted light value, calculate one or more reflectance ratios between the at least one master reflected light value and at least one reflected light value derived from the reflected light signal for the test documents, and adjust at least one master transmitted light value based on the at least one reflectance ratio.

35. A method for analyzing currency in a currency handling device comprising:

sensing reflected light from a first side of a test currency bill;

calculating a reflectance ratio based on a master reflected light value and the reflected light from the test currency bill; and adjusting a master transmitted light value based on the reflectance ratio.

36. A currency handling device comprising:

an input receptacle adapted to receive a stack of test currency bills;

a currency transport mechanism adapted to transport the test currency bills;

a light source disposed along a first side of the currency transport mechanism and adapted to direct light toward the currency transport mechanism and further adapted to illuminate the test currency bills from a first side of the test currency bills;

a reflected light sensor disposed along the first side of the currency transport mechanism and adapted to generate an analog reflected light signal corresponding to the amount of light reflected from the first side of the test currency bills;

a transmitted light sensor disposed along a second side of the currency transport mechanism and adapted to generate an analog transmitted light signal corresponding to the amount of light transmitted through the test currency bills to a second side of the test currency bills;

at least one amplifier electrically coupled to the reflected light sensor and the transmitted light sensor and adapted to amplify the analog light reflected light signal and the analog transmitted light signal;

an analog-to-digital converter electrically coupled to the amplifier and adapted to convert the amplified analog reflected light signal into a digital reflected light signal and further adapted to convert the amplified analog transmitted light signal into a digital transmitted light signal;

a memory adapted to contain at least one master reflected light value and at least one master transmitted light value associated with at least one type of test currency;

a processor electrically coupled to the analog-to-digital converter and to the memory and adapted to:

(1) receive the digital reflected light signal, (2) generate at least one reflected light value for a test currency bill, (3) access the memory to retrieve the master reflected light value and the master transmitted light value associated with the type of the test currency bill;

(4) calculate a reflectance ratio based on the reflected light value for the test currency bill and the master reflected light value associated with the type of the test currency bill;

(5) receive the digital transmitted light signal;

(6) generate at least one transmitted light value for the test currency bill;

(7) adjust the master transmitted light value based on the reflectance ratio, (8) compare the adjusted master transmitted light value to the transmitted light value for the test currency bill, and (9) generate a doubles signal if the comparison of the adjusted master transmitted light value with the transmitted light value for the test currency bill indicates that more than one currency bill is present; and an operator interface electrically coupled to the processor and adapted to receive the doubles signal and indicate the receipt of a doubles signal.

37. The device of claim 36 adapted to allow a user to specify the type of the test currency bill.

38. The device of claim 36 wherein the processor is further adapted to automatically determine the type of the test currency bill.

39. The device of claim 38 wherein the processor is adapted to automatically determine the type of test currency bill by comparing a pattern for the test currency bill to stored patterns for a variety of types of currency.

40. The currency handling device of claim 36 wherein the processor is adapted to adjust the master transmitted light value by multiplying the master transmitted light value by the reflectance ratio.

41. The currency handling device of claim 36 wherein the processor is adapted to calculate the reflectance ratio by dividing the reflected light value of the test document by the master reflected light value.

42. The currency handling device of claim 36 wherein the processor is adapted to adjust the master transmitted light value by multiplying the master transmitted light value by an inverse of the reflectance ratio.

43. The doubles detection system of claim 24 wherein the processor is adapted to adjust the master transmitted light value by multiplying the master transmitted light value by the reflectance ratio.

44. The doubles detection system of claim 24 wherein the processor is adapted to calculate the reflectance ratio by dividing the reflected light value of the test document by the master reflected light value.

45. The doubles detection system of claim 24 wherein the processor is adapted to adjust the master transmitted light value by multiplying the master transmitted light value by an inverse of the reflectance ratio.

46. The method of claim 25 wherein adjusting the master transmitted light value comprises multiplying the master transmitted light value by the reflectance ratio.

47. The method of claim 25 wherein calculating the reflectance ratio comprises dividing the reflected light value of the test document by the master reflected light value.

48. The method of claim 25 wherein adjusting the master transmitted light value comprises multiplying the master transmitted light value by an inverse of the reflectance ratio.

49. The document handling device of claim 28 wherein the processor is adapted to adjust the master transmitted light value by multiplying the master transmitted light value by the reflectance ratio.

50. The document handling device of claim 28 wherein the processor is adapted to calculate the reflectance ratio by dividing the reflected light value of the test document by the master reflected light value.

51. The document handling device of claim 28 wherein the processor is adapted to adjust the master transmitted light value by multiplying the master transmitted light value by an inverse of the reflectance ratio.

* * * * *

UNITED STATES PATENT AND TRADEMARK OFFICE

CERTIFICATE OF CORRECTION

PATENT NO. : 7,103,206 B2
APPLICATION NO. : 09/779919
DATED : September 5, 2006
INVENTOR(S) : Bradford T. Graves et al.

It is certified that error appears in the above-identified patent and that said Letters Patent is hereby corrected as shown below:

In Claim 16, Col. 27, line 65, change “an” to --on--;

In Claim 24, Col. 28, line 49, change “document,” to --document;--;

In Claim 24, Col. 28, line 66, change “far” to --for--;

In Claim 26, Col. 29, line 37, change “far” to --for--;

In Claim 27, Col. 29, line 50, change “tight” to --light--;

In Claim 28, Col. 30, line 24, change “tight” to --light--;

In Claim 29, Col. 30, line 51, change “specie” to --specify--.

Signed and Sealed this

Sixth Day of February, 2007

JON W. DUDAS

*Director of the United States Patent and Trademark Office*